Figure 1:
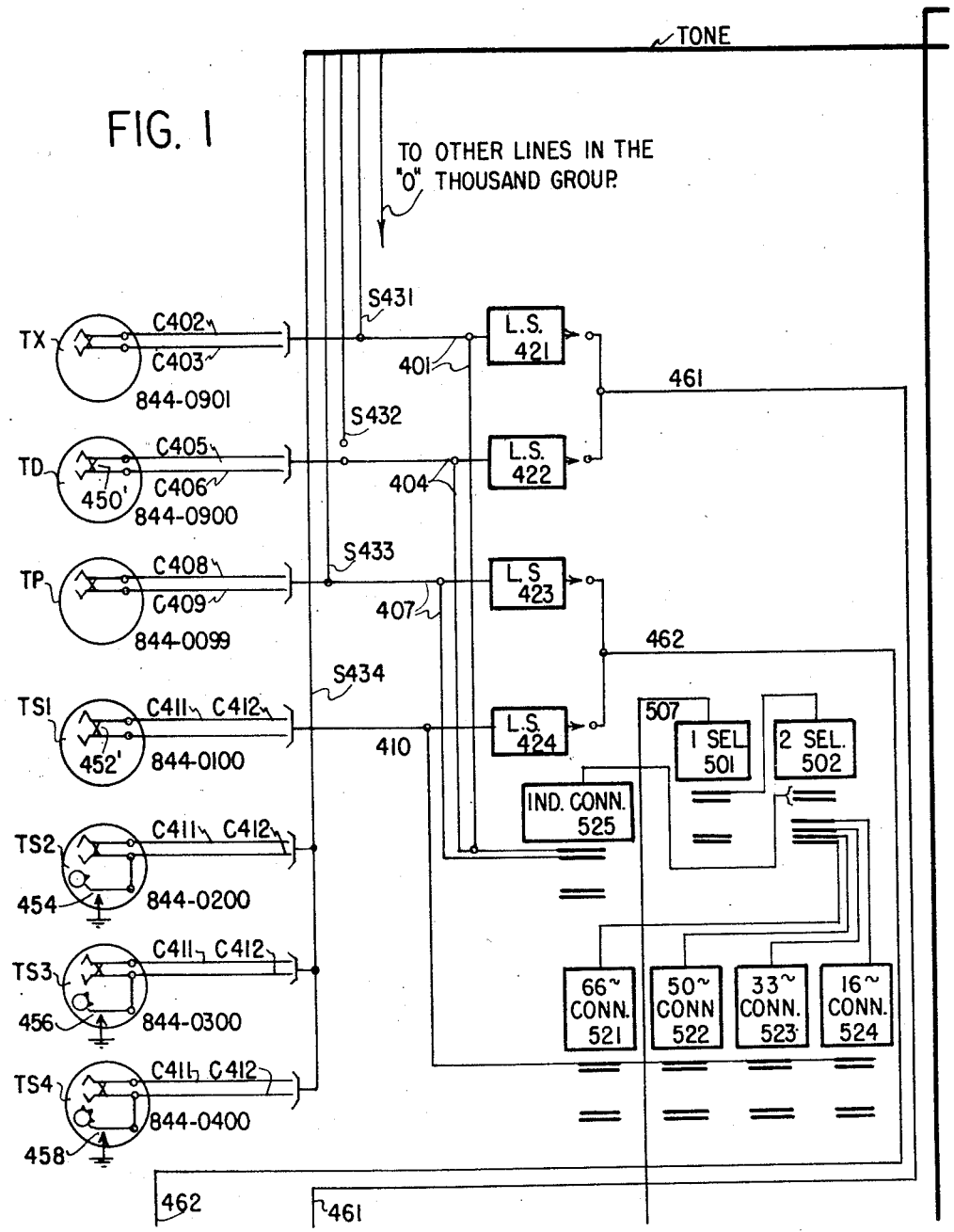

Dec. 26, 1950     J. E. OSTLINE     2,535,513
TESTING DEVICE FOR LINE IDENTIFYING EQUIPMENT
Original Filed Feb. 23, 1946     14 Sheets-Sheet 1

INVENTOR.
JOHN E. OSTLINE
BY
Smith, Olsen & Baird
ATTYS

INVENTOR.
JOHN E. OSTLINE

Dec. 26, 1950   J. E. OSTLINE   2,535,513
TESTING DEVICE FOR LINE IDENTIFYING EQUIPMENT
Original Filed Feb. 23, 1946   14 Sheets-Sheet 5

INVENTOR.
JOHN E. OSTLINE
BY
Smith, Olsen & Baird
ATTYS.

Dec. 26, 1950  J. E. OSTLINE  2,535,513
TESTING DEVICE FOR LINE IDENTIFYING EQUIPMENT
Original Filed Feb. 23, 1946  14 Sheets-Sheet 8

INVENTOR.
JOHN E. OSTLINE
BY
Smith, Olsen & Baird
ATTYS.

Dec. 26, 1950          J. E. OSTLINE          2,535,513

TESTING DEVICE FOR LINE IDENTIFYING EQUIPMENT

Original Filed Feb. 23, 1946          14 Sheets-Sheet 13

INVENTOR.
JOHN E. OSTLINE
BY
Smith, Olsen & Baird
ATTYS.

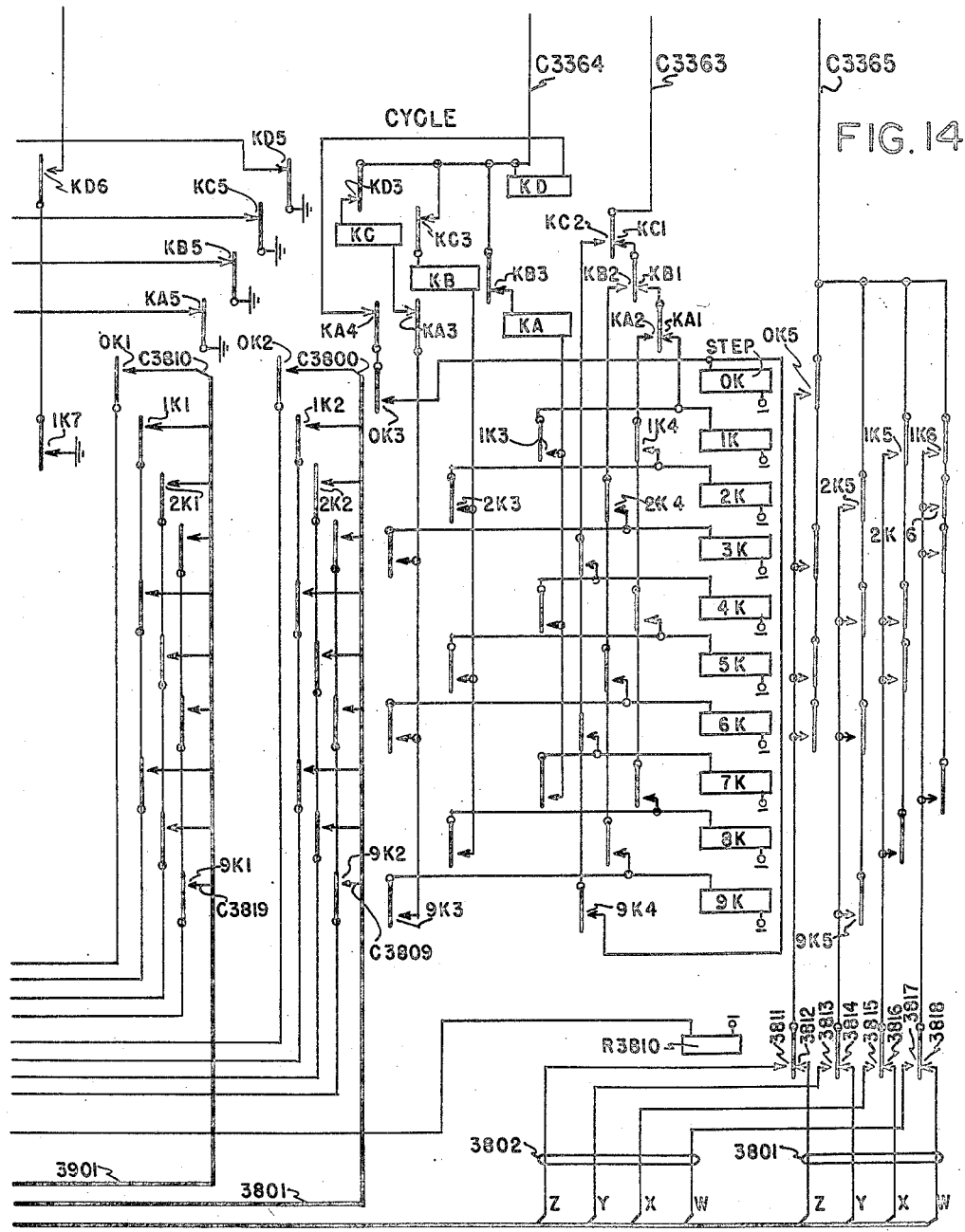

Patented Dec. 26, 1950

2,535,513

UNITED STATES PATENT OFFICE 2,535,513

TESTING DEVICE FOR LINE IDENTIFYING EQUIPMENT

John E. Ostline, Chicago, Ill., assignor to Automatic Electric Laboratories, Inc., Chicago, Ill., a corporation of Delaware Original application February 23, 1946, Serial No. 649,583. Divided and this application May 24, 1949, Serial No. 95,063

11 Claims. (Cl. 179—175.2)

The present invention relates to automatic telephone systems and more particularly to line detecting apparatus. More specifically, the present invention relates to line detecting apparatus adapted to be incorporated in an automatic toll ticketing telephone system of the character disclosed in the copending application of John E. Ostline, Serial No. 453,799, filed August 6, 1942. This application is a division of the copending application of John E. Ostline Serial No. 649,-583, filed February 23, 1946.

In an automatic toll ticketing telephone system, such, for example, as that disclosed in the above-mentioned Ostline application, Serial No. 453,799, a common calling line detector is provided which is arranged to identify the directory number of a calling individual subscriber line or the terminal number of a calling subscriber substation on a calling party line. This detector is arranged to determine the terminal number of the calling subscriber by making two cyclic tests for an identifying tone signal applied to a conductor of the calling subscriber line. During the first of the above-mentioned cyclic tests, the detector registers the number of steps that are taken to find the thousands group of terminals including the calling line thereby to detect the thousands digit of the calling subscriber terminal number and, simultaneously therewith, by means of an electron discharge device determines the hundreds group of terminals including the calling subscriber line in order to register the hundreds digit of the calling subscriber directory number. During the second of the above-mentioned cyclic tests, the detector counts the number of steps taken to determine the tens group of terminals including the calling subscriber line in order to register the tens digits of the calling subscriber directory number and, simultaneously therewith, the electron discharge device now functions to determine the units digit of the calling subscriber terminal number in order to register the units digit of the calling subscriber directory number. Since the calling line detector is a common unit of apparatus and is utilized in detecting the directory number of each of the calling subscribers, it is imperative that various tests be made of the detector to determine whether or not it is operating satisfactorily.

Accordingly, it is an object of the present invention to provide in an automatic toll ticketing telephone system including apparatus for determining the identity of the line terminal designation of calling subscriber lines, improved arrangements for testing the operated characteristics of the various components of the line detecting or identifying apparatus.

Further features of the invention pertain to the particular arrangement of the circuit elements of the line identifying or detecting apparatus of the system, whereby the above outlined and additional operating features are attained.

Figure 2:
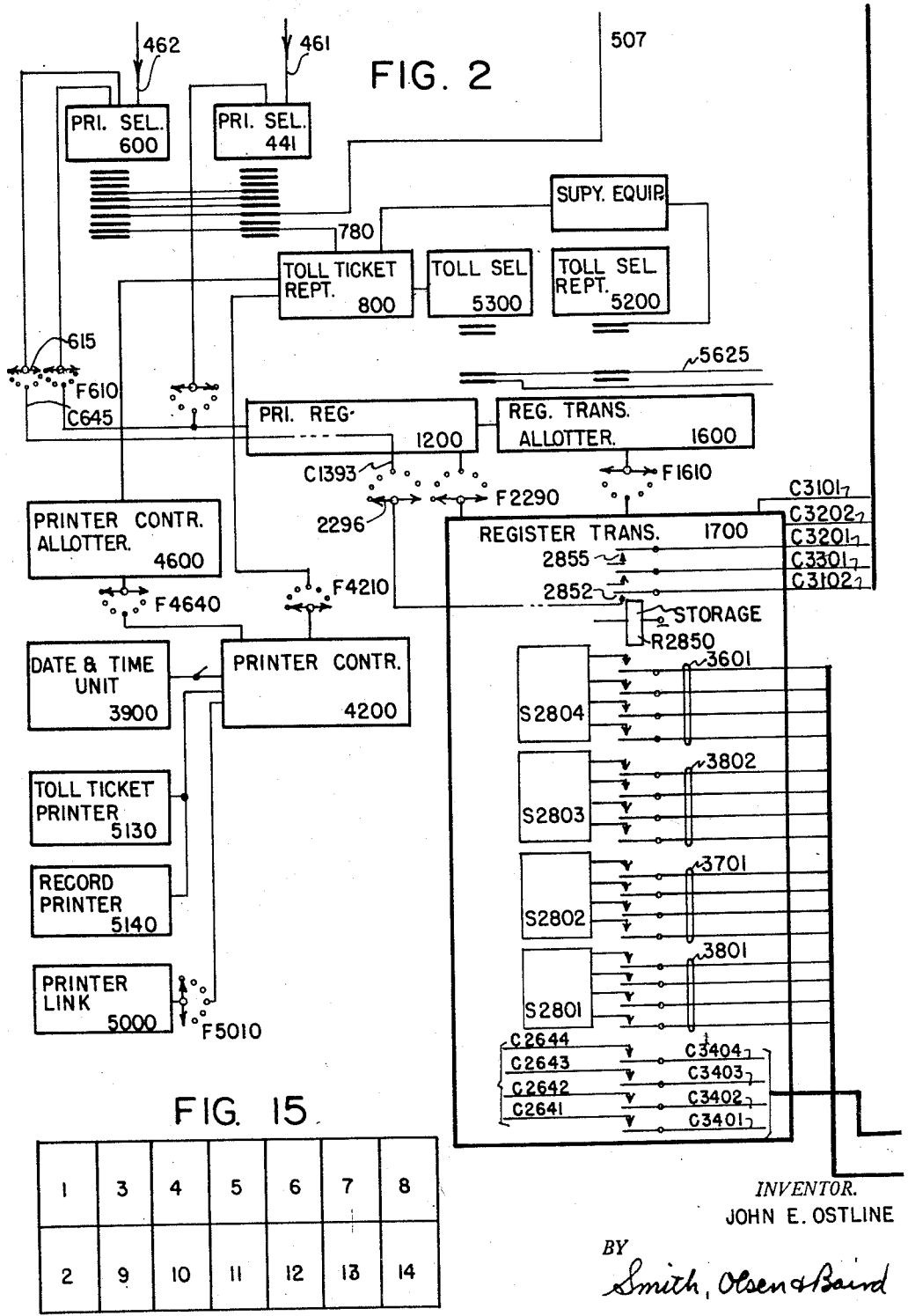
Figure 3:
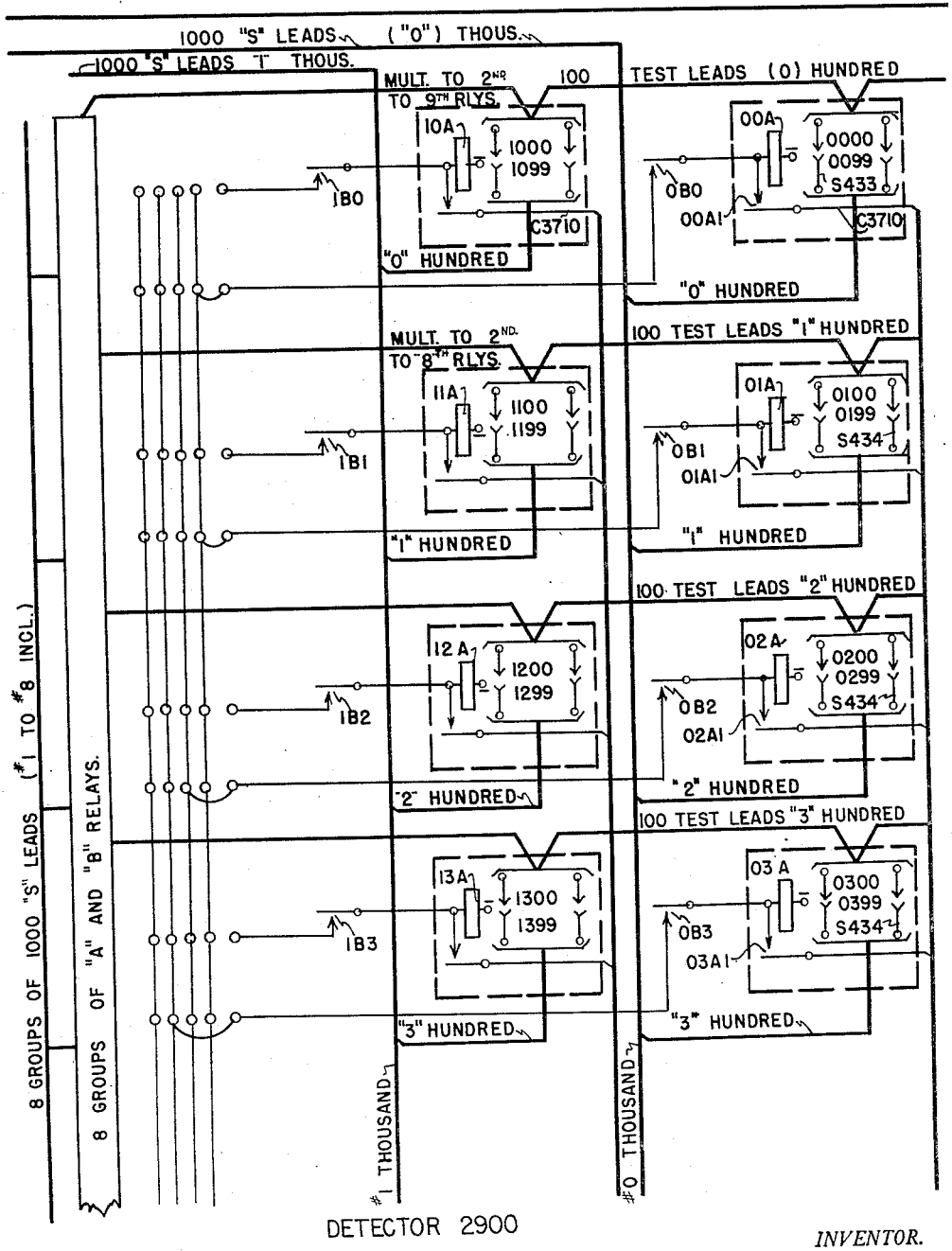

The invention, both as to its organization and method of operation, together with further objects and advantages thereof, will best be understood by reference to the following specification taken in connection with the accompanying drawings, in which Figs. 1 to 14, inclusive, illustrate the apparatus incorporated in the main exchange 4 in zone 84 of the telephone system, which apparatus has incorporated therein the features of the invention as briefly outlined above; and Fig. 15 illustrates the mode of combining Figs. 1 to 14, inclusive, to form a unified system. More particularly, Figs. 1 and 2 illustrate schematically a major portion of the apparatus incorporated in exchange 4 in zone 84; while Figs. 3 to 14, inclusive, illustrate the details of the detector provided in exchange 4, zone 84.

The general arrangement of the telephone system

As disclosed in the previously mentioned copending Ostline application, Serial No. 649,583, filed February 23, 1946, the automatic telephone system serves a large metropolitan area including a plurality of zones, each of which includes one or more exchange areas. Certain of the zones may be located adjacent to the main exchange zone and other zones, being more distant, may be reached only by way of a toll tandem exchange which functions as a toll switching center and provides the necessary amplifying repeaters for connections extended to the more distant zones. More specifically, the area served by the telephone system comprises zones 27, 62, 84 and 86; zone 27 includes the exchanges 2 and 3; zone 62 includes the single exchange illustrated; zone 84 includes the exchanges 4, 5, 6 and 7; and zone 86 includes the exchanges 3 and 7. Each exchange in each of the zones comprises a 10,000 terminal unit, even though it may not be initially installed to serve its ultimate terminal capacity. The lines terminating at each of the exchanges in the system comprise private subscriber lines, party subscriber lines, denied toll service subscriber lines, and extended service subscriber lines. The party lines in the present system are of the four party type and are arranged on a terminal-per-station basis, thus providing each subscriber substation on a party line with a separate distinct directory number.

The various exchanges in each of the zones are interconnected with the main exchange 4 zone 84 by suitable groups of trunk lines for the purpose of enabling subscribers in the main exchange to extend connections to subscriber lines terminating in any of the exchanges included in the telephone system. Furthermore, the various exchanges in the telephone system are also interconnected by suitable groups of trunk lines, not shown, to enable the subscribers thereat to extend connections to subscriber lines terminating in the main exchange 4 zone 84 and also to extend connections to subscriber lines terminating in other exchanges included in the telephone system.

In the automatic telephone system the various local, trunk, and toll calls are set up by automatic switching apparatus under the control of the subscriber substation equipment, including the usual calling device or dial. In order to facilitate the setting up of various connections, a mixed numbering scheme is utilized in the automatic telephone system, whereby all called subscriber substations in the various exchanges in the various zones of the system are dialed as listed in the directory. Accordingly, the directory number of each subscriber substation in the telephone system comprises a code portion, including either two or three digits, and a numerical portion, including four digits. More particularly, the directory number of certain of the subscriber substations in zone 62 comprises a code portion, including only the digits "6" and "2," in view of the fact that there is only one exchange in this zone, while other subscriber substations in this exchange may also be identified by a code portion comprising three digits; whereas the directory number of each subscriber substation in zones 27, 84 and 86 comprises a code portion including three digits, in view of the fact that there are a plurality of exchanges in each of these zones. Thus, it will be understood that the directory number of each subscriber substation in zone 84, for example, will comprise a code portion, including the digits "8" and "4," and an additional digit identifying the particular exchange in zone 84, including the subscriber substation. Accordingly, the directory number of each subscriber substation in exchange 4 zone 84, for example, will comprise a code portion, including the digits "8," "4" and "4." Further, it is pointed out that in view of the fact that the party subscriber lines are arranged on a terminal-per-station basis, the directory number of each subscriber substation in each exchange in each zone comprises, in addition to the code portion, a numerical portion including only four digits, no suffix digit being necessary. In view of the above, it will be understood that the directory numbers of the various subscriber substations in the telephone system comprise different numbers of digits, the number of digits varying between six and seven, depending upon the particular zone of the exchange including the subscriber substation.

*The apparatus incorporated in exchange 4 zone 84 of the telephone system*

Preferably, each exchange in the telephone system comprises apparatus substantially identical to that provided in exchange 4 zone 84, which apparatus includes, as shown in Figs. 1 to 14, inclusive, automatic switching equipment serving a maximum of 10,000 terminals, three of the terminals respectively terminating the private subscriber lines 401, 404 and 407, and four of the terminals commonly terminating the party subscriber line 410. The switching equipment comprises a number of line switches individually associated with the subscriber lines terminating at exchange 4 zone 84, the line switches 421, 422, 423 and 424 being respectively associated with the private subscriber lines 401, 404 and 407 and the party subscriber line 410. At this point it is noted that the private subscriber line 401 has a private subscriber substation TX connected thereto which is rendered extended private subscriber substation service; the private subscriber line 404 has a private subscriber substation TD connected thereto which is rendered denied toll private subscriber substation service; the private subscriber line 407 has a private subscriber substation TP connected thereto which is rendered ordinary private subscriber substation service; while the party subscriber line 410 has four party subscriber substations TS1, TS2, TS3 and TS4 connected thereto which are rendered party subscriber substation service. More particularly, the ordinary private subscriber substation TP and the party subscriber substations TS1, TS2, TS3 and TS4 are rendered free automatic local service, automatic toll service to the exchanges in the various zones in the metropolitan area for which charges are made on a monetary basis, as well as long distance toll service via a manual toll operator position. The extended service private subscriber substation TX is rendered free automatic local service, free automatic toll service to certain exchanges in adjacent zones in the metropolitan area, automatic toll service to other exchanges in the various zones in the metropolitan area for which charges are made on a unit call basis, as well as long distance toll service via a manual toll operator position. Finally, the denied toll service private subscriber substation TD is rendered free automatic local service, toll service to the exchanges in the various zones in the metropolitan area via a manual intercepting operator position, as well as long distance toll service via a manual toll operator position.

Further, it is noted that the line switch 421, terminating the extended service private subscriber line 401, as well as the line switch 422, terminating the denied toll service private subscriber line 404, are arranged in a first group; while the line switch 423 terminating the ordinary private subscriber line 407, as well as the line switch 424, terminating the party subscriber line 410, are arranged in a second group. Also, the switching equipment comprises a first group of primary selectors, including the primary selector 441 which is accessible to the line switches 421 and 422 and other similar line switches in the first group; as well as a second group of primary selectors, including the primary selector 600 which is accessible to the various line switches 423 and 424 and other similar line switches in the second group. Each primary selector is provided with an individually associated finder having access to a group of primary registers, the finders F442 and F610 being respectively associated with the primary selectors 441 and 600.

Further, exchange 4 zone 84 is provided with a group of primary registers, including the primary register 1200 which is accessible to the various finders individually associated with the primary selectors in the two groups. Further, there is also provided a group of register translator, including the register translator 1700, and a register translator allotter 1600. The register translator allotter 1600 comprises a finder F1610 having access to the group of register translators; and each register translator comprises a finder having access to the group of primary registers, the register translator 1700 comprising the finder F2290 having access to the group of primary registers including the primary register 1200. At this point it is noted that the group of primary registers is larger than the group of register translators in order to effect a saving in equipment, in view of the fact that the connection and arrangement of a primary register is much more simplified than the relatively complex connection and arrangement of a register translator.

Also, exchange 4 zone 84 is provided with a local switch train comprising a number of groups of first selectors, one of the groups including the first selector 501; a number of groups of second selectors, one of the groups including the second selector 502; a number of groups of individual connectors, one of the groups including the individual connector 525; a number of special service selectors, including the special service selector 503; and a number of groups of party connectors, four of the groups respectively including the party connectors 521, 522, 523 and 524. A manual switchboard is also provided in exchange 4 zone 84 which includes a manual operator position 0, a toll operator position 110, a miscellaneous operator position 112, an information operator position 113, and an intercepting operator position 114.

In addition to the apparatus described above, exchange 4 zone 84 is provided with toll ticketing apparatus comprising, in addition to the number of register translators, including the register translator 1700, a number of groups of toll ticketing repeaters, one of the groups including the toll ticket repeater 800. The toll ticketing apparatus comprises a detector 2900, a number of printer controllers, including the printer controller 4200, a printer controller allotter 4600, a date and time unit 3900, a printer link 5000, a toll ticket printer 5130, and a record printer 5140. The printer controller allotter 4600 comprises a finder F4640 having access to the printer controllers and each printer controller comprises a finder having access to the toll ticket repeaters. For example, the printer controller 4200 comprises the finder F4210 having access to the toll ticket repeater 800. The printer link 5000 comprises a finder F5010 having access to the printer controllers and is directly connected to the toll ticket printer 5130 and the record printer 5140. The date and time unit 3900 is commonly associated with the printer controllers.

Further, exchange 4 zone 84 comprises a number of groups of toll selector repeaters, one of the groups including the toll selector repeater 5200, and a number of groups of toll selectors, one of the groups including the toll selector 5300, individually associated with the various groups of toll ticket repeaters. For example, the toll selector 5300 is individually associated with the toll ticket repeater 800 and the toll selector repeater 5200 is one of a plurality of toll selector repeaters which terminate in the banks of the primary selector 441. Also, extending from the exchange 4 zone 84 are a number of groups of outgoing trunks to exchanges in other zones. The group of trunks terminating in the first level in the banks of the toll selector 5300 extends to the toll tandem exchange and is utilized in completing connections to the exchanges in zones 62 and 86. The group of trunks terminating in the second level in the banks of the toll selector repeater 5200 and multiplied to the corresponding level in the banks of the toll selector 5300 extends to the exchange 2 in zone 27, which is located in an area adjacent to the area served by the exchange 4 in zone 84. The latter group of trunks is utilized in the completion of connections to exchanges 2 and 3 in zone 27.

In exchange 4 zone 84 the various primary selectors, such as 441 and 600, have access to trunk lines extending to the other exchanges located in zone 84. For example, the fifth, sixth and seventh levels in the banks of the primary selectors 441 and 600 terminate the respective groups of trunks over which connections may be extended to exchanges 5, 1 and 7, respectively, located in zone 84. Furthermore, the primary selectors 441 and 600 have access to the first selector 501 by way of one of the trunks of the group of trunks terminating in the fourth level of the associated bank contacts; they have access to the special service selector 503 by way of one of the trunks of the group of trunks terminating in the first level; they have access to the manual operator position 0 by way of one of the trunks in the group of trunks terminating in the tenth level; they have access to the toll ticket repeater 800 by way of one of the trunks in the group of trunks terminating in the second level; and only the primary selector 441 has access to the toll selector repeater 5200 by way of one of the trunks in the group of trunks terminating in the third level of its associated bank contacts. The special service selector 503, in turn, has access to the toll operator position 110, the miscellaneous operator position 112, the information operator position 113, and the intercepting operator position 114. Also the various first selectors, such as 501, in the local switch train have access to the different groups of second selectors; while the various groups of second selectors have access to a number of groups of individual connectors and to a number of groups of party connectors. For example, the group of second selectors, including the second selector 502, has access to the group of individual connectors, including the individual connector 525, and the four groups of party connectors, respectively, including the party connectors 521, 522, 523 and 524. Further, each individual connector has access to an associated group of private subscriber lines and each party connector in each related group of four has access to an associated group of the party subscriber lines. For example, the individual connector 525 has access to a group of 100 private subscriber lines, including the private subscriber lines 401, 404 and 407; while the four party connectors 521, 522, 523 and 524 have access to 100 party subscriber lines, including the party subscriber line 410. At this point it is noted that each of the party connectors 521, 522, 523 and 524 is adapted to seize the party subscriber line 410 and respectively to project ringing current thereover having the respective frequencies in cycles per second of 66, 50, 33, and 16.

Further, it is noted that the detector 2900 has access to each subscriber line terminating at exchange 4 zone 84 and is commonly associated with the various register translators in this exchange. Furthermore, each printer controller in the exchange is accessible to the printer controller allotter 4600 therein and has access to each toll ticket repeater. Finally, each printer controller is accessible to the printer link 5000; while the printer link 5000 is directly connected to the toll ticket printer 5130 and to the record printer 5140. Moreover, the date and time unit 3900 is commonly associated with each printer controller in exchange 4 zone 84.

Each subscriber substation in exchange 4 zone 84 is provided with the usual substation apparatus including a telephone instrument, a ringer, and a calling device or dial. The calling devices disposed at each ordinary private subscriber substation, at each extended service subscriber substation, at each denied toll service private subscriber substation, and at each first party subscriber substation, are of conventional construction and arrangement; while the calling devices disposed at each second, third and fourth party subscriber substation are of special construction. More particularly, the calling device disposed at each second, third and fourth party subscriber substation is of the construction and arrangement of that disclosed in the copending application of John E. Ostline, Serial No. 404,103, filed July 26, 1941, now U. S. Patent No. 2,410,520, granted November 5, 1946.

Figure 4:
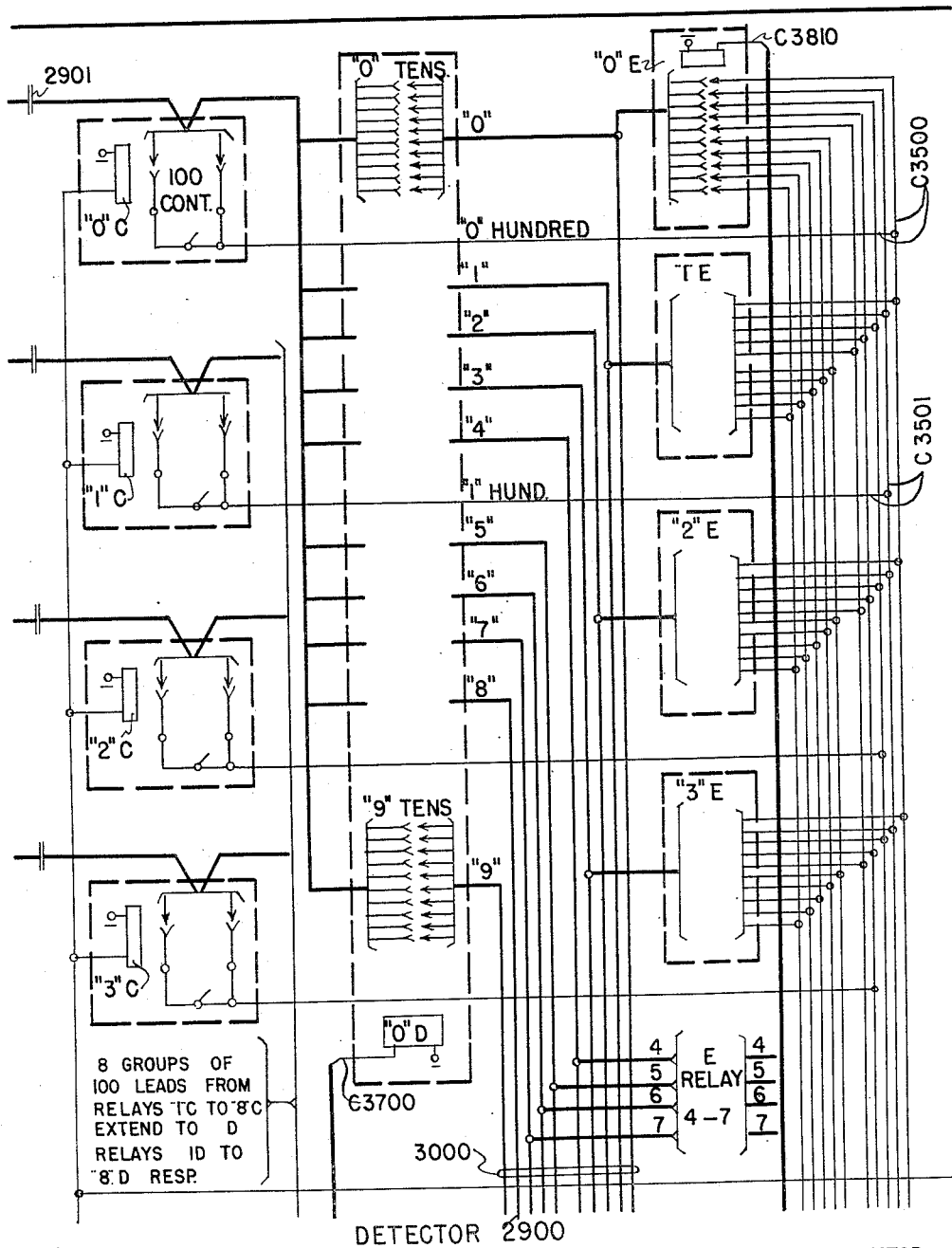

For example, the calling devices respectively disposed at the second party subscriber substation TS2, at the third party subscriber substation TS3, and at the fourth party subscriber substation TS4 are of the special construction mentioned, each comprising, as best shown in Fig. 4, in addition to a set of impulse springs, a set of cam springs. In each of these calling devices the set of impulse springs is operated in accordance with the pull of the associated finger wheel in order to transmit a corresponding variable series of switch control impulses, while the set of cam springs is operated by an associated cam governed by the associated finger wheel in order to transmit a fixed number of substation identifying ground impulses. More specifically, when the finger wheel of the calling device at the second party subscriber substation TS2 is pulled in accordance with a digit constituting two or more impulses, the associated cam operates the the set of cam springs to transmit one substation identifying ground impulse over the associated party subscriber line 410. Similarly, when the finger wheel of the calling device at the third party subscriber substation TS3 is pulled in accordance with a digit constituting two or more impulses, the associated cam operates the set of cam springs to transmit two substation identifying ground impulses over the associated party subscriber line 410. Finally, when the finger wheel of the calling device at the fourth party subscriber substation TS4 is pulled in accordance with a digit constituting two or more impulses, the associated cam operates the set of cam springs to transmit three substation identifying ground impulses over the associated party subscriber line 410.

Figure 6:
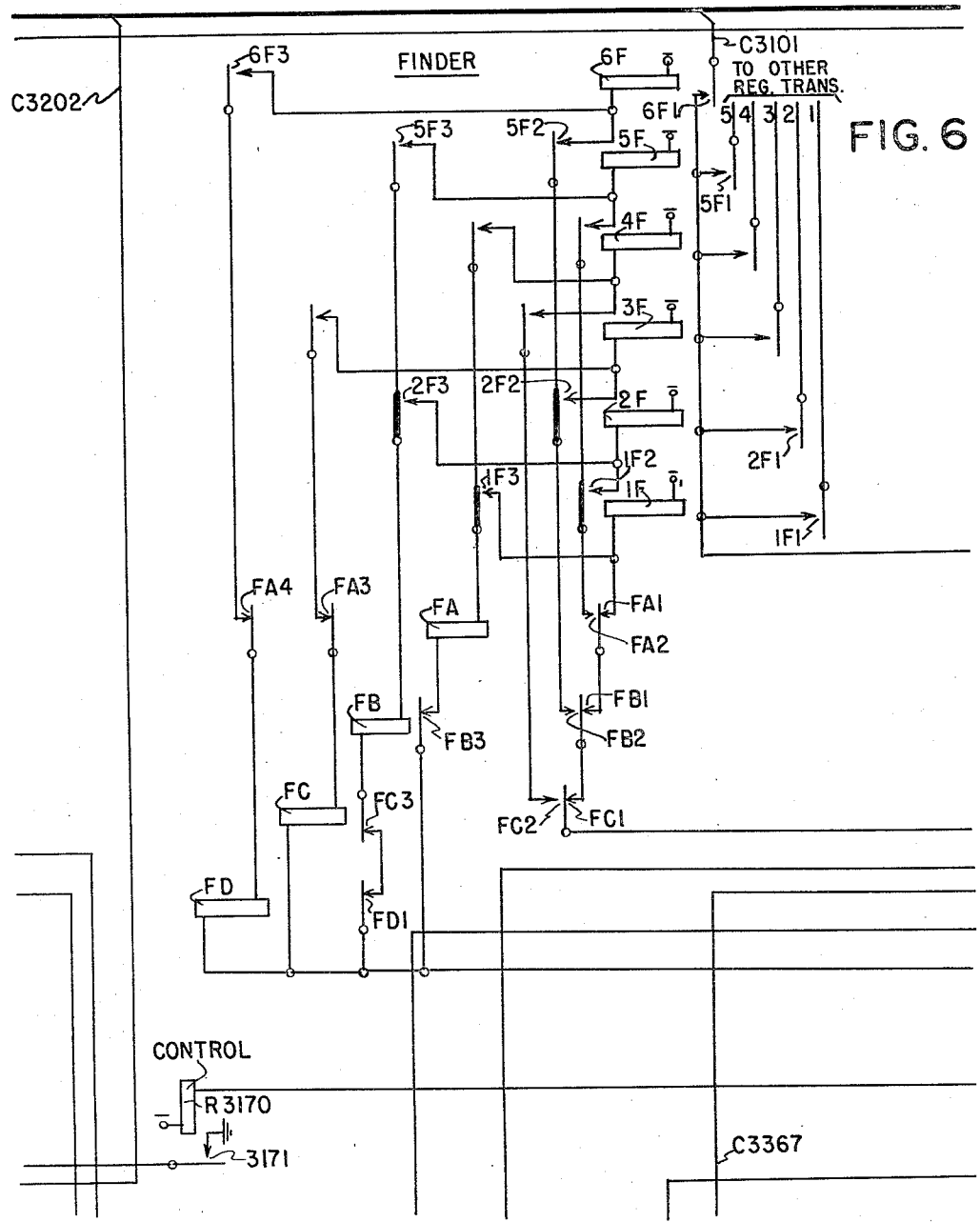
Figure 7:
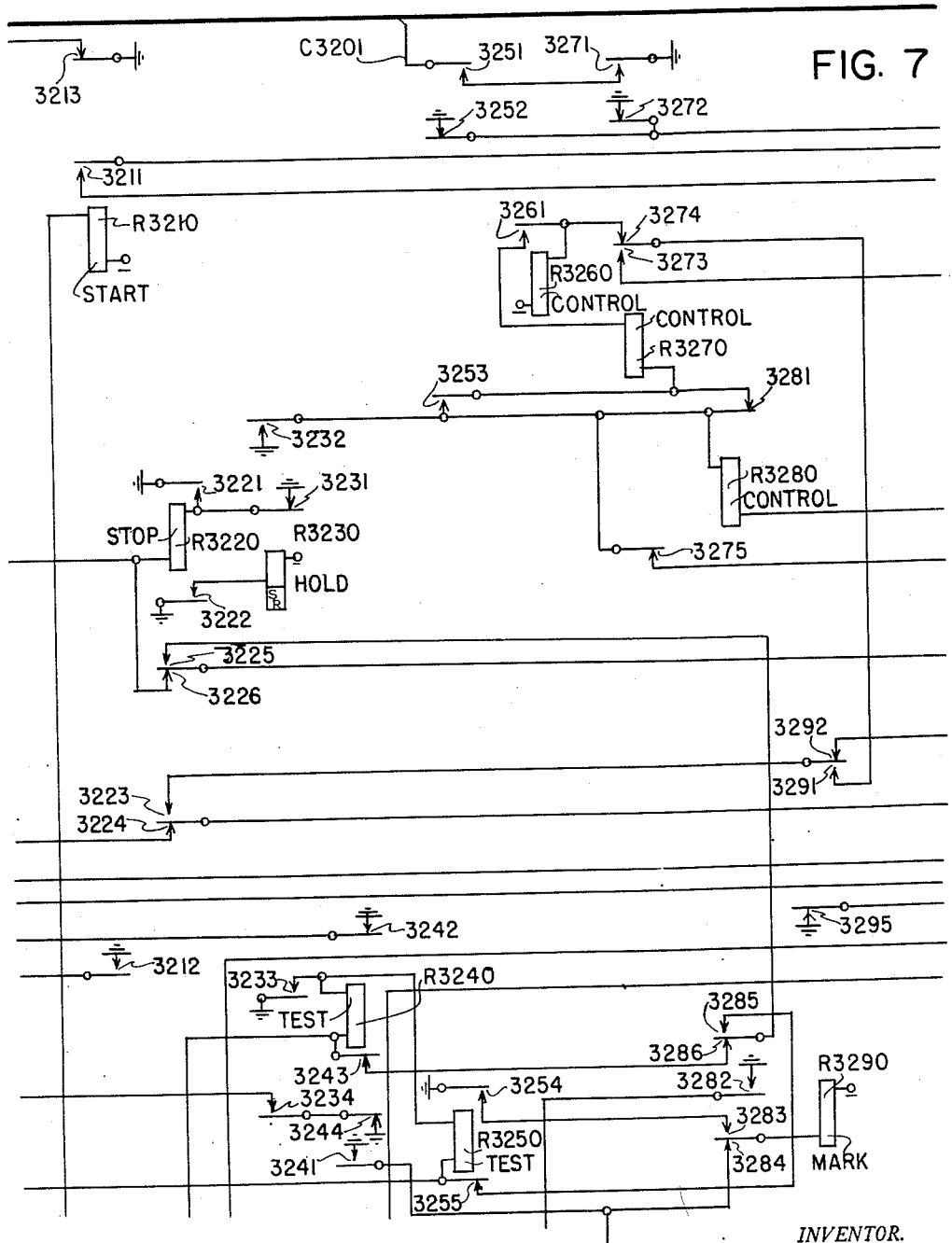
Figure 8:
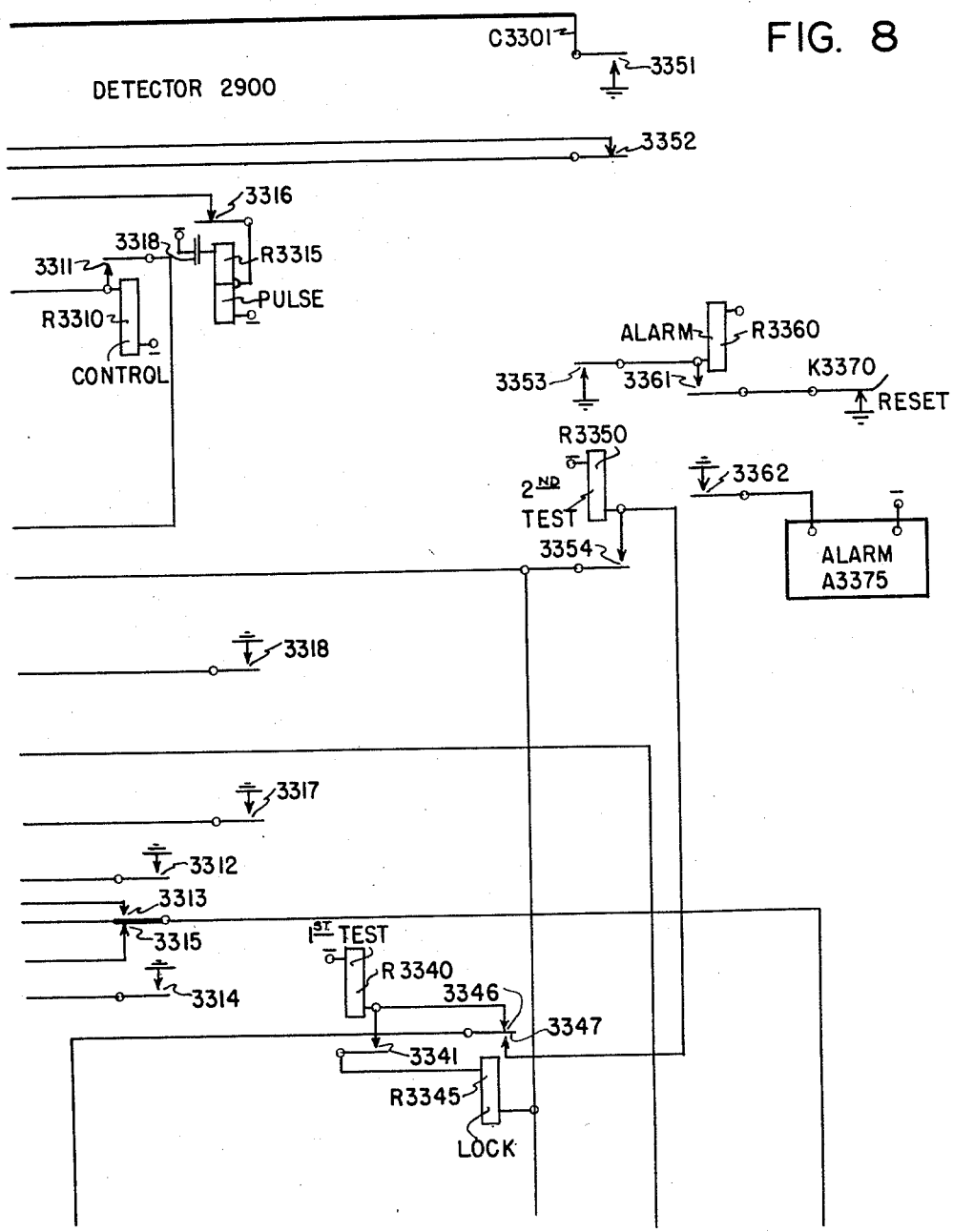
Figure 9:
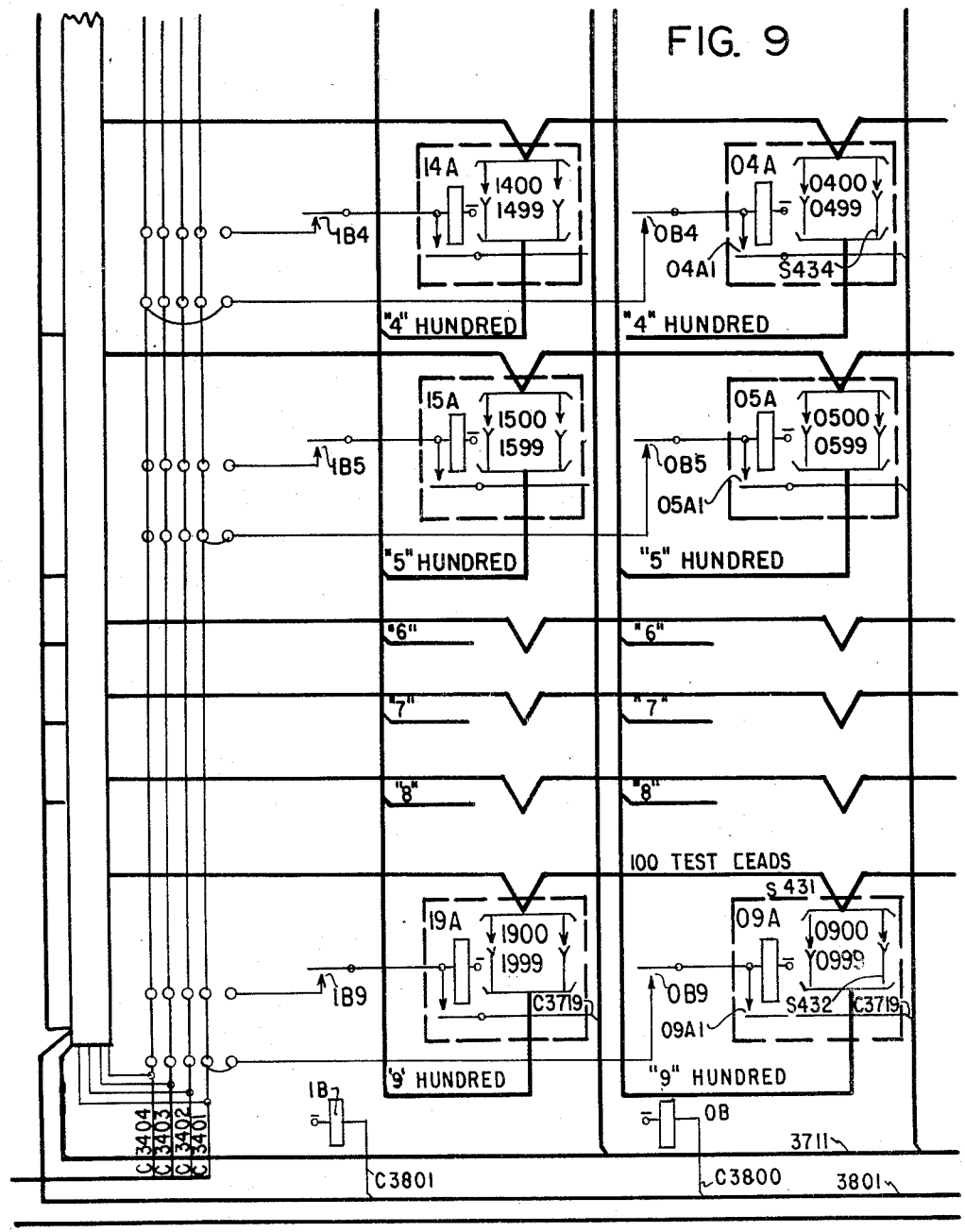
Figure 10:
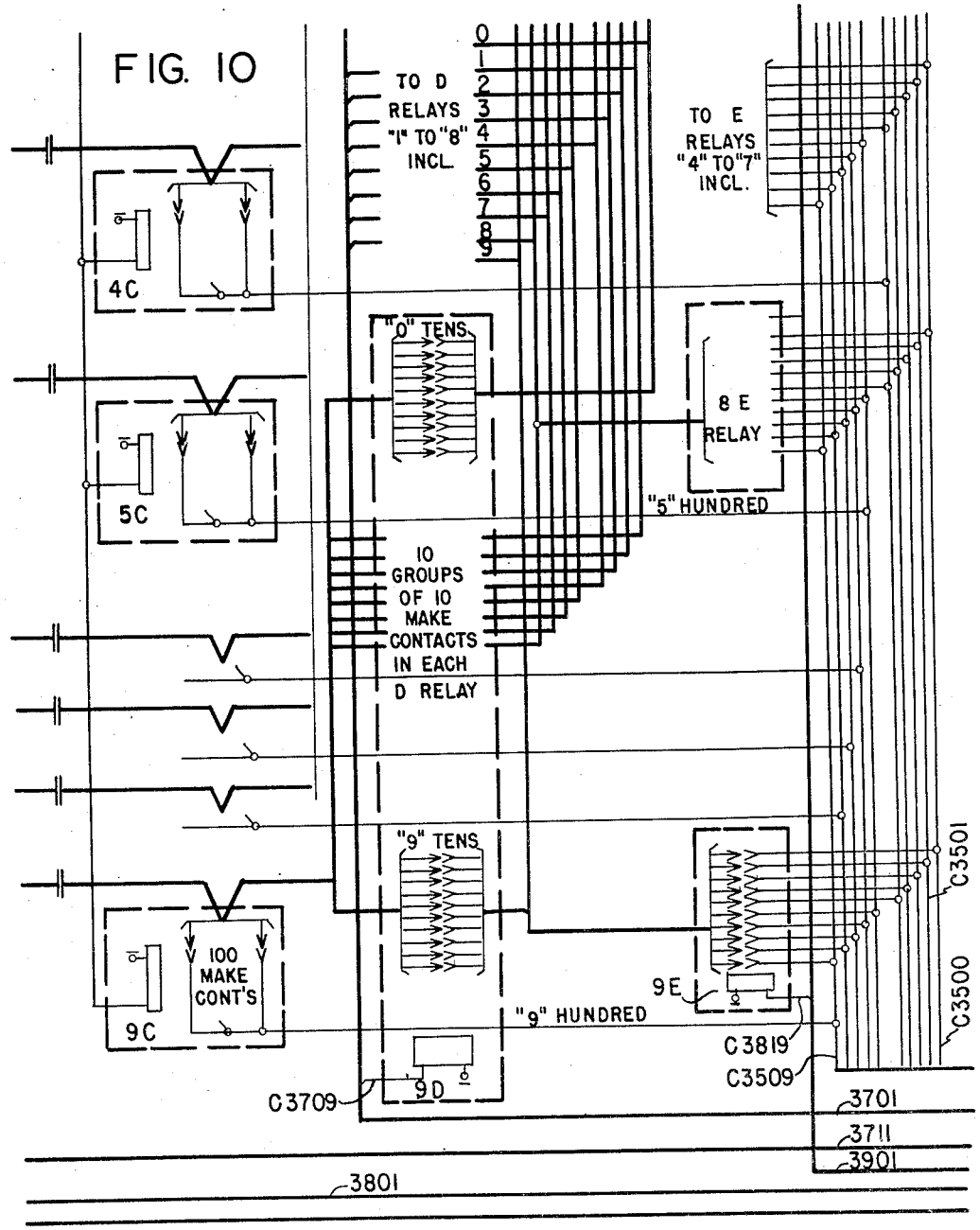

Preferably, in exchange 4 zone 84, the line switches 421, 422, 423, 424, etc., diagrammatically illustrated in Fig. 1 are of conventional construction and arrangement; while the primary selectors 600, etc., the toll ticket repeaters 800 etc., the primary registers 1200, etc., the register translators 1700 etc., the register translator allotter 1600, the printer controller 4200 etc., the printer link 5000, the toll ticket printer 5130, the record printer 5140, the toll selector repeater 5200, the toll selector 5300 and the supervisory equipment diagrammatically illustrated in Fig. 2 are of the construction and arrangement of the corresponding elements disclosed in the previously mentioned copending application of John E. Ostline, Serial No. 649,583, filed February 23, 1946. More specifically, in the last-mentioned Ostline application the primary selector 600 is illustrated in Figs. 6 and 7 thereof; the toll ticket repeater 800 is illustrated in Figs. 8 to 11, inclusive, thereof; the primary register 1200 is illustrated in Figs. 12A and 12 to 16, inclusive, thereof; the register translator 1700 is illustrated in Figs. 17A, 23A, and 17 to 28, inclusive, thereof; the date and time unit 3900 is illustrated in Figs. 39 to 41, inclusive, thereof; the printer controller 4200 is illustrated in Figs. 42 to 49, inclusive, thereof; the printer link 5000 is illustrated in Fig. 50 thereof, the toll ticket printer 5130 and the record printer 5140 are illustrated in Fig. 51 thereof; the toll selector repeater 5200 is illustrated in Fig. 52 thereof; the toll selector 5300 is illustrated in Fig. 53 thereof; and the supervisory equipment is illustrated in Figs. 54 and 55 thereof.

The detector 2900 included in exchange 4 in zone 84 has access to 10,000 terminals and comprises, as is shown in Figs. 3 to 14, inclusive, ten groups of A relays, each group of A relays including ten individual A relays.

The tenth group of A relays mentioned is illustrated and comprises the individual A relays 00A to 09A, inclusive, and is associated with the 1,000 S leads from the "0" thousands connectors. Each A relay comprises 100 make contacts, whereby a given A relay in the tenth group is operative to connect the corresponding 100 S leads in the "0" thousand group to the detector 2900 for test purposes. The first group of A relays mentioned is also illustrated and comprises the individual A relays 10A to 19A, inclusive, and is associated with the 1000 S leads from the "1" thousand connectors. Each of the A relays in the "1" thousands group also comprises 100 make contacts, whereby a given A relay in the first group is operative to connect the corresponding 100 S leads in the "1" thousand group to the detector 2900 for test purposes.

At this point, it is noted that the S lead S431 extends to the line switch 421 individually associated with the private subscriber line 401, and is accessible to the 09A relay included in the "0" thousand group of A relays, whereby the first two digits of the numerical portion of the directory number of the private subscriber line 401 are the digits 09, and the four digits of the numerical portion of the directory number of the extended service private subscriber substation TX connected to the private subscriber line 401 may be 0901. Similarly, the S lead S432 extends to the line switch 422 individually associated with the private subscriber line 404, and is accessible to the 09A relay included in the "0" thousand group of A relays, whereby the first two digits of the numerical portion of the directory number of the private subscriber line 404 are the digits 09, and the four digits of the numerical portion of the directory number of the denied toll service private subscriber substation TD connected to the private subscriber line 404 may be 0900. In a like manner the S lead S433 extends to the line switch 423 individually associated with the private subscriber line 407, and is accessible to the 00A relay included in the "0" thousand group of A relays, whereby the first two digits of the numerical portion of the directory number of the private subscriber line 407 are the digits 00, and the four digits of the numerical portion of the directory number of the ordinary private subscriber substation TP connected to the private subscriber line 407 may be 0099. Finally, the S lead S434 extends to the line switch 424 individually associated with the party subscriber line 410, and is accessible to the 01A, 02A, 03A and 04A relays included in the "0" thousand group of A relays, whereby the first two digits of the numerical portion of the directory number of the party subscriber line 410 are the digits 01, 02, 03, or 04, depending upon the particular calling party subscriber substation on the party line. The four digits of the numerical portion of the directory numbers of the party subscriber substations TS1, TS2, TS3 and TS4 connected to the party subscriber line 410 may be, respectively, 0100, 0200, 0300, or 0400.

Also, the detector 2900 comprises 1000 test leads arranged in ten groups of 100 each; each group of 100 test leads is multiplied to the corresponding A relay in each group of ten, whereby each A relay in each thousand group of A relays is operative to connect the associated group of 100 S leads to the associated group of 100 test leads. The 100 test leads connected to the contacts of the 00A relay are multiplied to the corresponding A relays in all other thousand groups.

Further, the detector 2900 comprises ten B relays 0B to 9B, inclusive, individually associated with the corresponding groups of A relays, the tenth B relay 0B being individually associated with the tenth or "0" thousand group of A relays 00A to 09A, inclusive, and the first B relay 1B being individually associated with the first or "1" thousand group of A relays 10A to 19A, inclusive. Further, the detector 2900 comprises four hold conductors C3401, C3402, C3403 and C3404, which are suitably multiplied to make contacts provided on the various B relays. More particularly, the first hold conductor C3401 is multiplied via contacts of the appropriate ones of the B relays to the windings of the various ones of the A relays and each group corresponding to the private subscriber substations and to first party subscriber substations; while the second, third and fourth hold conductors C3402, C3403 and C3404 respectively are multiplied via the contacts of the appropriate ones of the B relays to the windings of the various ones of the A relays in each group, respectively corresponding to the second, third and fourth party subscriber substations. For example, the first hold conductor C3401 is multiplied via the contacts 0B9, 0B5, and 0B9 to the windings of the A relays 09A, 05A and 09A, respectively, corresponding to groups of private subscriber substations including the private subscriber substations TP, TX and TD. The first hold conductor C3401 is also multiplied via the contacts 0B1 to the winding of the A relay 01A corresponding to a group of first party subscriber substations including the first subscriber substation TS1. Similarly, the second, third and fourth hold conductors C3402, C3403 and C3404 respectively are multiplied via the contacts 0B2, 0B3 and 0B4 to the windings of the A relays 02A, 03A and 04A, respectively, corresponding to groups of second, third and fourth party subscriber substations including the party subscriber substations TS2, TS3 and TS4.

Further, the detector 2900 comprises ten C relays 0C to 9C, inclusive, respectively corresponding to the ten groups of 100 test leads, and ten test conductors C3500 to C3509, inclusive. Each C relay is operative to connect its associated group of 100 test leads to the corresponding one of the test conductors. For example, the ninth C relay 9C is operative to connect the ninth group of 100 test leads to ninth test conductor C3509, and the zero C relay 0C is operative to connect the first group of 100 test leads to the zero test conductor C3500. Also, the detector 2900 comprises ten D relays 0D to 9D, inclusive, respectively corresponding to the ten groups of 100 test leads, and ten E relays 0E to 9E, inclusive. Each D relay is provided with 100 contacts and is operative to connect its associated group of 100 test leads to 100 conductors included in an associated riser cable 3000, the corresponding contacts of each of the D relays being multipled to the corresponding 100 conductors in the riser cable 3000. Each of the E relays is operative to connect a particular group of ten conductors in the riser cable 3000 to the ten corresponding test conductors C3500 to C3509, inclusive. For example, when the ninth D relay 9D and the ninth E relay 9E are operated, the ninth group of 100 test leads is connected to the corresponding 100 conductors in the riser cable 3000, and the ninth group of ten conductors in the riser cable 3000 is respectively connected to the ten test conductors C3500 to C3509, inclusive. For example, when the ninth D relay 9D and the ninth E relay 9E are operated, the ninth group of 100 test leads is connected to the corresponding 100 conductors in the riser cable 3000, and the ninth group of ten conductors in the riser cable 3000 is respectively connected to the ten test conductors C3500 to C3509, inclusive.

Further, the detector 2900 comprises ten amplifiers 0AMP to 9AMP, inclusive, respectively connected to the ten test conductors C3500 to C3509, inclusive, and ten test stop relays 0R to 9R, inclusive, respectively associated with the ten amplifiers 0AMP to 9AMP, inclusive. The amplifier and detector circuit comprising the amplifier 0AMP is shown in detail in Fig. 11, and it will be understood that the amplifier and detector circuits comprising the amplifiers 0AMP to 9AMP, inclusive, shown in Fig. 12 are of similar construction. Also, the detector 2900 comprises ten test mark relays 0T to 9T, inclusive, ten test lock relays 0S to 9S, inclusive, ten step relays 0K to 9K, inclusive, and a first set of four cycle relays KA, KB, KC and KD. Further, the detector 2900 comprises a number of finder relays 1F to 6F, inclusive, individually corresponding to the various register translators, the finder relay 6F individually corresponding to the register translator 1700. Further, the detector 2900 comprises a second set of four cycle relays FA, FB, FC and FD, a testing circuit shown in Fig. 5 for testing the operation of the various amplifiers 0AMP to 9AMP, inclusive, and a plurality of control relays illustrated in Figs. 7 and 8.

Finally, the detector 2900 comprises four groups of marking leads 3801, 3701, 3802 and 3601 of the WXYZ type, which are respectively utilized for the purpose of marking the first, second, third and fourth digits of a detected directory number. More particularly, the WXYZ conductors in the first and third groups of marking leads 3801 and 3802 are marked by the various step relays 0K to 9K, inclusive, while the WXYZ conductors in the second and fourth groups of marking leads 3701 and 3601 are respectively marked by the various test lock relays 0S to 9S, inclusive, and by the various test mark relays 0T to 9T, inclusive.

More particularly, it is pointed out that the

WXYZ conductors in each of the groups of marking leads 3801, 3802, 3701 and 3801 are marked in accordance with a code arrangement. For example, the various step relays 9K to 9K, inclusive, mark the WXYZ conductors in the first group of marking leads 3801 in accordance with the particular thousand digit of the directory number of the calling subscriber line terminating at exchange 4 zone 84 and detected by the detector 2900, in accordance with the following code:

| Particular Thousand Digit | Marked WXYZ Conductors in the First Group of Marking Leads 3801 |
|---|---|
| 1 | W and X |
| 2 | W and Y |
| 3 | W and Z |
| 4 | X and Y |
| 5 | X and Z |
| 6 | Y and Z |
| 7 | W |
| 8 | X |
| 9 | Y |
| 0 | Z |

A better understanding of the connection and arrangement of the apparatus incorporated in the telephone system will be facilitated from a consideration of the general operation thereof in conjunction with detailed operation of the detector 2900 incident to the extension of a metropolitan toll call from exchange 4 zone 84, as will appear hereinafter.

*The general operation of the telephone system*

Considering now the general operation of the telephone system, it is noted that, when a metropolitan toll call is extended from one of the private subscriber substations or one of the party subscriber substations in exchange 4 zone 84 to a remote exchange in zone 84 or to an exchange in another zone, a special toll ticket individual to the toll call is prepared therefor by the toll ticketing apparatus, which toll ticket includes the various items of record information pertaining thereto including the identification of the directory number of the calling private or party subscriber substation, the identification of the called zone and exchange of the called subscriber substation as well as the terminal designation of the directory number of the called subscriber substation, the rate applicable to the call, the time duration of the call, and perhaps the charge item in monetary values which is to be assessed for the call. The identification of the terminal of the calling private or party subscriber substation in exchange 4 zone 84, performed by virtue of the operation of the detector 2900 as explained more fully below.

Assuming that a metropolitan toll call is initiated at the calling private subscriber substation TP and is to be extended to a called subscriber substation in an exchange in a different zone, the call is first initiated at the calling private subscriber substation TP when the subscriber thereat removes the receiver of the telephone instrument from its associated switchhook. As a result thereof the line switch 423 individual to the private subscriber line 497 extending to the calling private subscriber substation TP is controlled and operates to seize a trunk extending to an idle primary selector. For example, the line switch 423 may seize the trunk 462 extending to the primary selector 600; whereupon the finder F610 individual to the primary selector 600 operates to seize the conductors extending to an idle primary register such, for example, as the conductors extending to the primary register 1200. At this time the primary register 1200 operates in order to cause a dial tone to be returned over the finder F610, the primary selector 600, the trunk 462, the line switch 423, the private subscriber line 497 to the calling private subscriber substation TP. The subscriber at the calling private subscriber substation TP now proceeds to dial the directory number of the desired called subscriber substation, which directory number includes a code portion which is registered in the primary register 1200. The registration of the code portion of the directory number of the called subscriber substation in the primary register 1200 indicates that the call is a metropolitan toll call, whereby the register translator allotter 1600 is controlled in order to cause the finder F1610, individually associated therewith, to assign an idle one of the register translators, such, for example, as the register translator 1700. The assigned register translator 1700 is controlled, whereby the finder F2290 individually associated therewith is operated to select the conductors extending to the calling primary register 1200. The code digits registered in the primary register 1200 are then transferred to the register translator 1700 and registered therein. Also, the first digit of the numerical portion of the directory number of the called subscriber substation dialed by the calling subscriber is registered in the primary register 1200 and is then transferred to the register translator 1700 and registered therein. The remainder of the digits of the numerical portion of the directory number of the called subscriber substation dialed by the calling subscriber are received by the primary register 1200 and repeated to the register translator 1700 and registered therein.

The register translator 1700 then operates in order to translate the digits of the code portion of the registered directory number into suitable route directing digits and then operates to transmit both the route directing digits and the digits of the numerical portion of the registered directory number over the finder F2290, the primary register 1200 and the finder F610, to the primary selector 600. The primary selector 600 responds to the first digit received from the register translator 1700 and operates to select a corresponding group of trunks and then operates to select an idle trunk in the previously selected group. For example, the primary selector 600 may operate to select the trunk 780 extending to the toll ticket repeater 800. The remainder of the digits are transmitted from the register translator 1700 via the finder F2290, the primary register 1200, the finder F610, the primary selector 600 and the trunk 780, to the toll ticket repeater 800. The toll ticket repeater 800 repeats the first digit received thereby to the toll selector 5300 individual to the toll ticket repeater 800, whereby the toll selector 5300 operates to select a corresponding group of toll lines and then operates to select an idle one of the toll lines in the previously selected group. The remainder of the digits received by the toll ticket repeater 800 are repeated thereby over the toll selector 5300 and the seized toll line, for example, the toll line 5625, whereby switching equipment associated with the first toll line operates in accordance with conventional practice to extend the connection to the called subscriber substation in the called exchange in the called zone.

Also the registration of the digits of the code portion of the directory number in the register translator 1700 indicates that the present call is a metropolitan toll call and that the terminal designation of the calling subscriber substation in exchange 4 zone 84 must be identified and the register translator 1700 operates to cause ground potential to be applied to the start conductor C3202 in order to initiate the operation of the detector 2900. Also, during the operation of the primary register 1200 a detection is performed in the event the calling subscriber substation is of the party type whereby the particular position of the calling party subscriber substation on the associated party line is registered. This registration is also transferred by the primary register 1200 to the register translator 1700.

Further, the register translator 1700 causes ground potential to be applied to one of the hold conductors C3401, C3402, C3403 and C3404, depending upon the character of the calling subscriber substation. More specifically, ground potential is applied to the first hold conductor C3401 in the event the calling subscriber substation is of the private type or is the first party subscriber substation on a calling party line; whereas ground potential is applied to the respective second, third or fourth hold conductors C3402, C3403 or C3404 in the event the calling subscriber substation is of the party type and is the respective second, third or fourth party subscriber substation on the associated party subscriber line. Also, the register translator 1700 operates to apply battery potential to the marking conductor C3101 individual thereto, thereby to mark the register translator 1700 as the calling register translator to the detector 2900.

The detector 2900 operates in response to the application of ground potential to the start conductor C3202 and finds the particular calling register translator 1700 which has been marked by the application of battery potential on the marking conductor C3101 individual thereto. The detector 2900 then operates to detect the terminal of the calling private or party subscriber substation and then marks the four groups of marking leads 3901, 3701, 3802 and 3601 respectively in accordance with the thousands, hundreds, tens and units digits of the identification of the terminal individual to the calling subscriber substation, the digits mentioned constituting the numerical portion of the directory number of the calling subscriber substation. The register translator 1700 registers the four digits identifying the terminal of the calling subscriber substation and transmits this identification together with other information in code form over the finder F2290, the primary register 1200, the finder F610, the primary selector 600, and the trunk 790, to the toll ticket repeater 800, which code information, representing certain items of record information pertaining to the present call, is stored in the toll ticket repeater 800. At this point it is noted that the register translator 1700 is so interlocked that it will not operate to transmit the last numerical digit to the toll ticket repeater 800 in order to complete the setting up of the connection to the called subscriber line unless the detector 2900 operates to detect the terminal number of the calling subscriber substation and the register translator 1700 operates to transmit all of the code information mentioned to the toll ticket repeater 800 to be registered therein.

However, assuming that the detector 2900 detects the terminal of the calling private subscriber substation TP and the register translator 1700 operates to transmit all of the code information mentioned to the toll ticket repeater 800, the register translator 1700 operates to transmit the last numerical digit of the called subscriber directory number in order to effect the setting up of the connection to the called subscriber substation, as previously noted. After the detector 2900 has operated to detect the terminal of the calling subscriber substation, it is released, and after the register translator 1700 has transmitted the last numerical digit to the toll ticket repeater 800, it is released together with the primary register 1200. At this time the various items of record information pertaining to the connection are registered in code form in the toll ticket repeater 800. When the subscriber at the called subscriber substation answers the call, the toll ticket repeater 800 operates to begin a timing operation in order to establish the time duration of the established connection.

Subsequently, when the subscriber at the calling subscriber substation TP in exchange 4, zone 84 and the called subscriber replace the receivers of the telephone instruments upon their associated switchhooks to terminate the established connection, the line switch 423, the primary selector 600, as well as the switching apparatus in the called exchange are released, in a conventional manner. However, the toll ticket repeater 800 and its associated toll selector 5300 are not released at the present time. The toll ticket repeater 800 is controlled in response to the release of the connection to cause the associated printer controller allotter 4600 to select an idle printer controller, such as the printer controller 4200, over the finder F4640 and the printer controller associates itself with the ticket repeater 800 over the finder F4210. The items of information pertaining to the established connection, which are registered in code form in the toll ticket repeater 800, are now transferred to the printer controller 4200. After the transfer of code information has been completed, the toll ticket repeater 800 and the associated toll selector 5300 are released and rendered available for additional calls. The printer controller 4200 then controls the associated date and time unit 3900, as well as the associated printer link 5000, whereby both the toll ticket printer 5130 and the record printer 5140 are controlled in order respectively to produce an individual toll ticket and an entry upon a common record of the various items of record information established in conjunction with the established connection whereby the last-mentioned equipment is then released.

In view of the foregoing explanation of the mode of operation of the apparatus incorporated in the telephone system to set up a metropolitan toll call from the calling private subscriber substation TP in exchange 4 zone 84 to a called subscriber substation in a called exchange in another zone, and to produce a toll ticket and an entry on a common record of the various items of record information pertaining to the connection, it will be understood that this apparatus is operative in a substantially identical manner to set up a metropolitan toll call from any calling subscriber substation in exchange 4 zone 84 to any desired called subscriber substation in any exchange and associated zone and to produce a toll ticket and an entry on a common record of the various items of record information pertaining thereto. For example, the apparatus is operative to set up a metropolitan toll call from any one of the calling party subscriber substations TS1, TS2, TS3 or TS4 connected to the party subscriber line 419 to a desired called subscriber substation in an exchange in another zone and to produce a toll ticket and an entry on a common record of the various items of record information pertaining to the connection. It is pointed out, however, that when a metropolitan toll call is extended from one of the calling party subscriber substations TS1, TS2, TS3 or TS4, the primary register is selectively controlled by the calling device at the calling party subscriber substation in order to register the identity of the position of the calling party subscriber substation on the associated party line 419 and to transmit this identification to the register translator 1700. The register translator 1700 thereafter operates selectively to apply ground potential to the one of the four hold conductors C3401, C3402, C3403 or C3404 corresponding to the identification of the position of the calling party subscriber substation on the associated party line 419. The ground potential is respectively applied to the hold conductor C3401, C3402, C3403 or C3404 when the calling party subscriber substation is respectively the party subscriber substations TS1, TS2, TS3 or TS4.

The application of ground potential to the hold conductors C3401, C3402, C3403 and C3404 governs the operation of the detector 2900 whereby the directory numbers of the respective calling subscriber substations TS1, TS2, TS3 and TS4 are detected as 0100, 0200, 0300 and 0400. The detector 2900 then operates to mark the four digits of the detected directory number of the calling party subscriber substation upon the corresponding groups of WXYZ marking leads 3801, 3701, 3802 and 3801 in the manner previously explained.

Detailed operation of the detector 2900

As previously explained in conjunction with the general operation of the telephone system incident to the setting up of the connection from the calling private subscriber substation TP in exchange 4 zone 64 to the desired called subscriber substation in an exchange in another zone, the register translator 1700 operates to apply ground potential to the start conductor C3202, to apply a battery potential to the test conductor C3101, and to apply ground potential to the first hold conductor C3401.

Referring to Fig. 6 of the detector 2900, it will be seen that the ground potential applied to the conductor C3202 is extended by way of the contacts 3633a, and the winding of the start relay R3210 to battery, thereby to cause the latter relay to operate. Also, referring to Fig. 6, it will be noted that the battery potential applied to the conductor C3101 marks the register translator 1700 as the calling register translator.

Upon operating, the start relay R3210 completes, at its contacts 3211, a circuit for energizing in multiple the upper and lower windings of the pulse relay R3315, which may be traced from ground at the contacts 3252 and 3272 by way of contacts 3352, 3211 and 3316, and the upper and lower windings of the relay R3315, to battery. The pulse relay R3315 operates over this circuit, thereby to interrupt, at its contacts 3316, the above-traced multiple circuit for energizing the upper and lower windings thereof, whereupon the windings of the relay are effectively short-circuited in series through the condenser 3318 in order to cause the latter relay to restore shortly thereafter. Accordingly, the pulse relay R3315 operates intermittently at a predetermined rate, depending upon the characteristic of the associated condenser 3318.

The first time the pulse relay R3315 operates and restores it completes and then interrupts, at its contacts 3317, a circuit including the contacts 3224, FC1, FB1 and FA1, for energizing the winding of the finder relay 1F. When thus energized the finder relay 1F operates to complete, at its contacts 1F3, a holding circuit for energizing the winding thereof in series with the cycle relay FA. This holding circuit extends from ground by way of the contacts 3212 and FB3, the winding of relay FA, the contacts 1F3, and the winding of relay 1F, to battery. Attention is directed to the fact that the holding circuit for relay 1F, which includes in series therewith the winding of the cycle relay FA, is not completed until the pulse relay R3315 restores to normal and removes the shunting ground from across the winding of the cycle relay FA. When this holding circuit is completed upon the restoration of the pulse relay R3315, the finder relay 1F is retained in its operated position and the cycle relay FA operates in series therewith. Also, upon operating, the finder relay 1F prepares, at its contacts 1F2, a point in a circuit, traced hereinafter, for energizing the winding of the finder relay 2F responsive to the next energization of the pulse relay R3315. Also, upon operating, the finder relay 1F prepares, at its contacts 1F1, a circuit including the contacts 3231 and the test conductor extending to the first register translator, not shown, for energizing the winding of the stop relay R3220 in the event the first register translator is a calling register translator.

Assuming that the register translator 1700, which constitutes the sixth register translator in the group, is the first translator marked as calling, the above-mentioned circuit for energizing the winding of the stop relay R3220 is not completed and further operation of the finder relays 1F, 2F, 3F, etc., takes place at this time. When the cycle relay FA operates, as described above, at its contacts FA1, it interrupts the previously traced initial circuit for energizing the winding of the finder relay 1F; at its contacts FA2 it prepares a further point in the previously mentioned circuit for energizing the winding of the finder relay 2F; and, at its contacts FA3 and FA4 it interrupts points in the circuits, traced hereinafter, for respectively energizing the windings of the cycle relays FC and FD. Upon the second operation and restoration of the pulse relay R3315, at its contacts 3317 it completes and interrupts a circuit substantially identical to that previously traced for the relay 1F, which now includes the contacts 3224, FC1, FB1, FA2 and 1F2, and the winding of the finder relay 2F, whereupon the latter relay operates and when the original energizing circuit therefor is opened, at the contacts 3317, it locks in series with the cycle relay FB over a circuit which now includes the contacts 2F3, the winding of the cycle relay FB, the contacts FC3, FD1 and 3212. Relay FB operates over this circuit and relay 2F remains in its operated position. Also, the finder relay 2F prepares, at its contacts 2F1, a test circuit for energizing the winding of the stop relay R3220 and it prepares, at its contacts 2F2, a circuit, traced hereinafter, for energizing the winding of the finder relay 3F. When the cycle relay FB operates in series with the finder relay 2F, at its contacts FB1 it opens a further point in the previously traced initial circuit for energizing the winding of the finder relay 2F; at its contacts FB2 it prepares a further point in the previously mentioned circuit for energizing the winding of the finder relay 3F; and, at its contacts FB3 it interrupts the previously traced holding circuit for energizing the winding of the finder relay IF in series with the cycle relay FA, thereby to cause the latter relays to restore. Upon restoring, the cycle relay FA, at its contacts FA3 and FA4, again prepares further points in the previously mentioned circuits for respectively energizing the windings of the cycle relays FC and FD; at its contacts FA1, it prepares a further point in the previously traced initial circuit for the finder relay IF; and, at its contacts FA2, it interrupts a further point in the previously traced initial circuit for the finder relay 2F. When the finder relay IF restores, at its contacts IF3 it interrupts a further point in the previously traced holding circuit for itself and the cycle relay FA; at its contacts IF2 it interrupts a further point in the previously traced initial circuit for the finder relay 2F; and, at its contacts IF1, it interrupts the previously traced test circuit including the stop relay R3220 and the first register translator, not shown.

In view of the foregoing explanation of the mode of operation of the finder relays IF and 2F, in conjunction with the cycle relays FA and FB, it will be understood that the finder relays IF to 6F, inclusive, are operated sequentially to test the respective register translators in order to detect the calling register translator in the group. Further, it is pointed out that the finder relays IF to 6F, inclusive, are operative continuously through repeated cycles until the calling register translator is detected thereby. At this point it is noted that the finder relays IF and 4F lock in series with the cycle relay FA; the finder relays 2F and 5F lock in series with the cycle relay FB; the finder relay 3F locks in series with the cycle relay FC; and the finder relay 6F locks in series with the cycle relay FD, in substantially the same manner as has been explained above in connection with the locking circuits for the finder relays IF and 2F.

In the present example, when the finder relay 6F operates it completes, at its contacts 6F3, a holding circuit substantially identical to that previously traced, which includes the contacts 3212, the winding of the cycle relay FD, the contacts FA4 and 6F3, and the winding of the finder relay 6F, whereupon the finder relay 6F is retained in its operated position and the cycle relay FD operates. Upon operating, the cycle relay FD, at its contacts FD1, interrupts the previously mentioned holding circuit for energizing in series the winding of the finder relay 5F and the winding of the cycle relay FB, thereby to cause the latter two relays to restore to normal. A'so the finder relay 6F, upon operating, at its contacts 6F1, completes a test circuit including the winding of the stop relay R3220 and the test conductor C3201 extending to the calling register 1700. It will be recalled that the conductor C3101 has battery potential applied thereto by the calling register translator 1700, and at this time the circuit is completed for energizing the winding of the stop relay R3220 in the detector 2900. This circuit may be traced from ground, at the contacts 3231, the winding of the stop relay R3220, the contacts 6F1, the conductor C3101 having battery potential applied thereto by the calling register translator 1700 as previously noted. When this circuit is completed, the stop relay R3220 operates.

In the register translator 1700 the storage relay R2850 operates shortly after the stop relay R3220 operates and it completes at the contacts 2852 a connection between the S lead S433, individually associated with the private subscriber line 407, and the detector 2900. This connection extends from the S lead S433 by way of the line switch 423, the control conductor of the trunk 462, the wiper 615 of the finder F610, the conductor C645, the primary register 1200, the conductor C1393, the wiper 2296 of the finder F2290, the contacts 2852, the conductor C3102 extending to Fig. 5 of the detector 2900, the winding 3154a of the transformer 3150a, to ground. Also, it is noted that the S lead S433 extending to the line switch 423 individually associated with the private subscriber line 407 also extends directly to Fig 3 of the detector 2900 and terminates in a contact of the tenth relay 00A in the "0" thousands group of A relays.

In the present example, it has been assumed that the call has been initiated by the subscriber at substation TP on the private subscriber line and as a result thereof the register translator 1700 applies ground potential to the first hold conductor C3401 at the time the storage relay R2850 operated in the manner previously noted. Furthermore, in the present example, no ground potential is applied to the second, third and fourth hold conductors C3402, C3403 and C3404 extending to the detector 2900.

Returning to the operation of the detector 2900, it is noted that the stop relay R3220 upon operating completes, at its contacts 3221, a holding circuit for energizing the winding thereof including the contacts 6F1 and the test conductor C3101; at its contacts 3222, it completes an obvious circuit for energizing the winding of the hold relay R3230 thereby to cause the latter relay to operate; at its contacts 3224, it opens a point in the previously traced circuit for respectively energizing the finder relays IF to 6F, inclusive, thereby to prevent further operation of these relays at this time; at its contacts 3225, it prepares a point in the circuit traced hereinafter for controlling the test relays R3240 and R3250; and, at its contacts 3223, it prepares a point in the circuit traced hereinafter for controlling the step relays IK to 9K, inclusive, and 0K.

The hold relay R3230 upon operating, at its contacts 3231, interrupts a point in the previously traced original circuit for energizing the stop relay R3220; at its contacts 3232, it completes a path for applying ground potential to the hold conductor C3364; at its contacts 3233, it prepares circuits traced hereinafter for respectively energizing the windings of the test relays R3240 and R3250; and, at its contacts 3234, it completes an obvious circuit for energizing the winding of the control relay R3170. When thus energized, the control relay R3170 operates and, at its contacts 3171, completes an obvious multiple circuit for energizing the windings of the C relays IC to 6C, inclusive, and 0C thereby to cause the latter relays to operate for the purpose more fully explained hereinafter.

It will be recalled that, when the detector 2900 was initially seized, the start relay R3210 operated and caused the intermittent operation of the pulse relay R3315 and the latter relay, in turn, controlled the cyclic operation of the finder relays IF to 6F, inclusive, in order to test for the calling register translator 1700. When the called register translator 1700 was encountered, the stop relay R3220 operated and prepared, at its contacts 3223, a circuit including the conductor C3363 for controlling the operation of the step relays 1K to 9K, inclusive, and 0K. The next time the pulse relay R3315 operates and then restores it completes and then interrupts, at its contacts 3317, a circuit for applying ground potential by way of the contacts 3317, 3223 and 3292 to the pulse conductor C3363. Consequently, each time the pulse relay R3315 operates and then restores, it applies a ground pulse to the pulse conductor C3363. The first time ground potential is applied to the pulse conductor C3363 a circuit is completed, by way of the contacts KC1, KB1 and KA1, for energizing the winding of the first step relay 1K. When thus energized the first step relay 1K operates to complete, at its contacts 1K3, a circuit, including the winding of the cycle relay KA, the contacts KB3, and the grounded conductor C3364, for short-circuiting the cycle relay KA until the ground pulse is removed from the pulse conductor C3363. Subsequently, when ground potential is removed from the pulse conductor C3363, the short circuit is removed from around the winding of the cycle relay KA and it energizes in series with the winding of the first step relay 1K. This circuit extends from the grounded conductor C3364 by way of the contacts KB3, the winding of the cycle relay KA, the contacts 1K3 and the winding of the first step relay 1K to battery. When this series holding circuit is completed the first step relay 1K is retained in its operated position and the cycle relay KA operates. Upon operating, the cycle relay KA interrupts, at its contacts KA3 and KA4, points in the holding circuits, traced hereinafter, for respectively energizing the windings of the cycle relays KC and KD; at its contacts KA1 it interrupts a further point in the previously traced initial circuit for energizing the winding of the first step relay 1K; and, at its contacts KA2, it prepares a circuit, traced hereinafter, for energizing the winding of the second step relay 2K.

The next time ground potential is applied to the pulse conductor C3363, the previously mentioned circuit for energizing the winding of the second step relay 2K is completed, by way of the grounded pulse conductor C3363, the contacts KC1, KB1, KA2 and 1K4, and the winding of relay 2K to battery. When thus energized the relay 2K operates to complete, at its contacts 2K3, a path substantially identical to that previously traced, for short-circuiting the winding of the cycle relay KB. Subsequently when ground potential is removed from the pulse conductor C3363, a holding circuit is completed for energizing in series the winding of the second step relay 2K and the winding of the cycle relay KB. This circuit extends from the grounded hold conductor C3364 by way of the contacts KC3, the winding of the cycle relay KB, the contacts 2K3, and the winding of the second step relay 2K to battery. When this holding circuit is completed, the second step relay 2K is retained in its operated position and the cyle relay KB operates. Upon operating, the cycle relay KB interrupts, at its contacts KB3, the previously traced holding circuit, including the windings of the cycle relay KA and the first step relay 1K, thereby to cause the latter relays to restore. Also, the cycle relay KB, at its contacts KB1, interrupts a further point in the previously traced initial circuit for energizing the winding of the second step relay 2K; at its contacts KB2 it prepares a point in a circuit, substantially identical to that previously traced, for energizing the winding of the third step relay 3K. When the cycle relay KA restores to normal, at its contacts KA3 and KA4, it prepares points in the previously mentioned holding circuits respectively for energizing the windings of the cycle relays KC and KD; and, at its contacts KA1, it again prepares a point in a circuit for energizing the winding of the first step relay 1K.

In view of the above description of the cycle of operation of the step relays 1K, 2K, etc., it will be understood that the step relays 1K to 9K, inclusive, and 0K, and the cycle relays KA, KB, KC and KD, are operated in the following order:

| Number of Operations and Restorations of the Pulse Relay R3315 | Operated Step and Cycle Relays |
| --- | --- |
| 1 | 1K and KA |
| 2 | 2K and KB |
| 3 | 3K and KC |
| 4 | 4K and KA |
| 5 | 5K and KB |
| 6 | 6K and KC |
| 7 | 7K and KA |
| 8 | 8K and KB |
| 9 | 9K and KC |
| 10 | 0K and KD |

Also, it is pointed out that the step relays 1K to 9K, inclusive, and 0K, and the cycle relay KA, KB, KC and KD are operative continuously through a plurality of cycles of the character noted above, until the operation thereof is arrested, in a manner more fully explained hereinafter.

Also, as a further result of the operation of the first step relay 1K, at its contacts 1K2, it prepares a path, including the contacts KA5 and 3717, for applying ground potential to the first marking conductor C3801 in the cable 3801, thereby to complete a circuit for energizing the first B relay 1B in order to cause the latter relay to operate, whereby the first thousand group of 1,000 S leads is tested, in a manner more fully explained hereinafter. Similarly, the second step relay 2K completes, at its contacts 2K2, a circuit, including the contacts KB5 and 3714, for applying ground potential to the second marking conductor in the cable 3801, thereby to complete a circuit for energizing the winding of the second B relay 2B, not shown, in order to cause the latter relay to operate, whereby the second thousand group of 1,000 S leads is tested. Finally, the tenth step relay 0K completes, at its contacts 0K2, a path, including the contacts KD5 and 3719, for applying ground potential to the tenth marking conductor C3800 in the cable 3801, thereby to complete an energizing circuit for the winding of the tenth B relay 0B in order to cause the latter relay to operate, whereby the tenth thousand group of 1,000 S leads is tested. From the foregoing description of the mode of operation of the step relays 1K to 9K, inclusive, and 0K, it will be understood that the relays are operated successively in order respectively to operate successively the relays 1B to 9B, inclusive, and 0B, whereby the latter relays successively connect and successively test the 1,000 S leads from each thousand group, in the 10,000 line system, corresponding to the operated B relay.

More particularly, when the tenth B relay 0B operates, it prepares, at its contacts 0B0 to 0B9, inclusive, circuits for energizing the windings of the ten A relays 00A to 09A, inclusive, which are connected to the first hold conductor C3401 are operated at this time, in view of the fact that only the first hold conductor C3401 has ground potential applied thereto by the register translator 1700. Accordingly, at this time the A relays 00A, 01A, 05A and 09A are operated when the associated 0B relay is operated. The remaining A relays in the "0" thousand group are not operated in the present example, since they are shown connected to the hold conductors C3402, C3403 and C3404, which are not grounded at the present time. Accordingly, when the 0B relay is energized, it completes, at its contacts 0B0, 0B1, 0B5 and 0B9, circuits for simultaneously energizing the A relays 00A, 01A, 05A and 09A, from the grounded hold conductor C3401.

When the tenth A relay 00A is thus energized it operates to connect the tenth group ("0" hundred) of 100 S leads in the "0" thousand group of S leads to the corresponding tenth group ("0" hundred) of 100 test leads. The first A relay 01A operates to connect the first group ("1" hundred) of 100 S leads in the "0" thousand group of S leads to the corresponding first group ("1" hundred) of 100 test leads; the fifth A relay 05A operates to connect the fifth group ("5" hundred) of 100 S leads in the "0" thousand group of S leads to the corresponding fifth group ("5" hundred) of 100 test leads; and, finally, the ninth A relay 09A operates to connect the ninth group ("9" hundred) of 100 S leads in the "0" thousand group of S leads to the corresponding ninth group ("9" hundred) of 100 test leads. Accordingly, at this time the tenth group ("0" hundred) of 100 S leads in the "0" thousand group of S leads is connected by way of the tenth A relay 00A to the tenth group ("0" hundred) of 100 test leads, and therefrom by way of the tenth C relay 0C, which is in its operated position as a result of the operation of the control relay R3170, to the tenth ("0" hundred) test conductor C3500; the first group ("1" hundred) of 100 S leads in the "0" thousand group of S leads is connected by way of the first A relay 01A to the first group ("1" hundred) of 100 test leads, and therefrom by way of the first C relay 1C, which is in its operated position as a result of the operation of the control relay R3170, to the first ("1" hundred) test conductor C3501; the fifth group ("5" hundred) of 100 S leads in the "0" thousand group of S leads is connected by way of the fifth A relay 05A to the fifth group ("5" hundred) of 100 test leads, and therefrom by way of the fifth C relay 5C, which is operated at this time, to the fifth ("5" hundred) test conductor C3505; and the ninth group ("9" hundred) of 100 S leads in the "0" thousand group of S leads is connected by way of the ninth A relay 09A to the ninth group ("9" hundred) of 100 test leads, and therefrom by way of the ninth C relay 9C, which is operated, to the ninth ("9" hundred) test conductor C3509. The tenth test conductor C3500 is individual to the tenth amplifier 0AMP and is connected to ground by way of the left-hand winding 3602b of the transformer 3602a and the parallel connected resistor; the first test conductor C3501 is individual to the schematically illustrated first amplifier 1AMP and is connected to ground (not shown) by way of a winding of a similar transformer included in the first amplifier 1AMP; and the fifth marking conductor C3505 and the ninth marking conductor C3509 are respectively connected to ground (not shown) through transformers respectively associated with the amplifiers 5AMP and 9AMP. At this time the S lead S433, individually associated with the private subscriber line 407, is also connected by way of the previously traced path, including the marking conductor C3500, to the tenth amplifier 0AMP, thereby to complete a circuit therethrough. It should be noted, however, that the other circuits, including the S leads connected to the marking conductors respectively associated with the other nine amplifiers 1AMP to 9AMP, inclusive, are not completed at this time due to the fact that the numerical portion of the directory number of the private subscriber line 407 is 0099, as previously noted, and no circuit is completed for the last-mentioned marking conductors.

A tone signal generated by the oscillator 3650 is transmitted in the manner to be described hereinafter, over the conductor C3102, the contacts 2852 of the operated relay R2850, the wiper 2296, the conductor C1393, the conductor C645, the wiper 615, the control conductor of the trunk 462, and the line switch 423 to which the line 407 of the calling subscriber is connected. This tone signal is further extended by way of the S lead S433 connected to the line switch 423 over the previously traced circuit including the various relays of the detector 2900, the test conductor C3500, and the left-hand winding of the transformer 3602a of the tenth amplifier 0AMP. When a tone signal is transmitted over the above-traced circuit to the tenth amplifier 0AMP, it operates in a manner to be described hereinafter, to cause the energization of the tenth test stop relay 0R. When thus energized, the stop relay 0R operates to complete, at its contacts 0R1, an energizing circuit for the test lock relay 0S, which may be traced from ground by way of the contacts 3242, the contacts 0R1, and the left-hand winding of the test lock relay 0S, to battery. Relay 0S operates over this circuit and, at its contacts 0S1 completes a holding circuit for itself and an energizing circuit for the test relay R3240. This circuit may be traced from ground at the contacts 3233 by way of the winding of the test relay R3240, the contacts 0S1, and the right-hand winding of the test lock relay 0S, to battery. When this series circuit is completed the tenth test lock relay 0S is retained in its operated position and the test relay R3240 operates. The test relay R3240, upon operating, at its contacts 3242, interrupts the previously traced circuit for energizing the left-hand winding of the test lock relay 0S; at its contacts 3241 it completes a multiple circuit for energizing the winding of the mark relay R3290 and the winding of the switch relay R2710, thereby to cause the latter relays to operate. Also, upon operating, the relay R3240, at its contacts 3244, interrupts the previously traced circuit for energizing the winding of the control relay R3170, thereby to cause the latter relay to restore and interrupt, at its contacts 3171, the previously traced multiple circuits for energizing the windings of the ten C relays 0C to 9C, inclusive, whereupon the latter relays restore. As a result of the restoration of the tenth C relay 0C, at its associated contacts it interrupts the previously traced tone signal circuit, including the tenth test conductor C3500, for operating the tenth amplifier 0AMP, thereby to cause the latter amplifier to restore in order to effect the restoration of the tenth stop relay 0R. As a further result of the operation of the tenth test lock relay 0S, at its contacts 0S5, it completes a holding circuit by way of the tenth hold conductor C3710 in the cable 3711, the contacts 00A1, and the winding of relay 00A, to battery; thereby to retain the latter relay in its operated position over a circuit which is independent of its initial energizing circuit. Attention is directed to the fact that the above mentioned holding circuit is completed for the relay 0OA before the circuit for the tenth B relay 0B is interrupted at contacts KD5 in response to the operation of the cycle relay KD.

As a result of the operation of the mark relay R3290, at its contacts 3292, it interrupts a point in the previously traced path for applying ground pulses to the conductor C3363, thereby positively to arrest further operation of the ten step relays 0K to 9K, inclusive, at this time; and, at its contacts 3291, it prepares a circuit including the contacts 3274 for subsequently energizing the control relay R3260. Also, the mark relay R3290, at its contacts 3293, completes an obvious path for applying ground potential to the marking conductor C3365 and an obvious multiple path including the contacts 3315 for applying ground potential to the marking conductor C3366. The application of ground potential to the marking conductor C3365 is effective to complete a path for applying ground potential to certain of the WXYZ conductors in the first group of marking leads 3801, depending upon the particular operated one of the step relays 0K to 9K, inclusive, at this time. In the present example, the tenth step relay 0K occupies its operated position, in view of the fact that one of the ten amplifiers 0AMP to 9AMP, inclusive, was operated incident to the operation of the tenth B relay 0B, in the manner previously explained. Hence, in the present example, the ground potential appearing upon the marking conductor C3365 is applied by way of the contacts 0K5 and 3812 to the Z conductor in the first group of marking leads 3801. The application of ground potential to the Z conductor in the first group of marking leads 3801 completes a circuit for operating the Z relay in the first code storage device in the register translator 1700. The marking of the Z conductor in the group of marking leads 3801 corresponds to the digit "0," whereby the digit "0" is registered in the first code storage device S2801 in the register translator 1700.

The application of ground potential to the marking conductor C3366 is effective to complete a path for applying ground potential to certain of the WXYZ conductors in the second group of marking conductors 3701, depending upon the particular operated one of the test lock relays 0S to 9S, inclusive. At this time the particular operated test lock relay is controlled by the particular one of the ten amplifiers 0AMP to 9AMP, inclusive, which was operated by the tone signal previously described. In the present example the tenth test lock relay 0S is locked in its operated position over a holding circuit including its righthand winding and the winding of the test relay R3240. Accordingly, the ground potential appearing upon the marking conductor C3366 is applied by way of the contacts 0S2 to the Z conductor in the second group of marking conductors 3701. The application of ground potential to the Z conductor of the marking conductors 3701 corresponds to the digit "0" and is effective to cause the digit "0" to be registered in the second code storage device S2802 in the register translator 1700, in the manner described above.

It will be recalled that the mark relay R3290, upon operating, prepared a circuit at its contacts 3291, for energizing the winding of the control relay R3260. Upon the next operation of the pulse relay R3315, at its contacts 3317, it completes the above-mentioned circuit for energizing the control relay R3260, thereby to cause the latter relay to operate. Upon operating, the control relay R3260 completes, at its contacts 3261, a holding circuit for itself in series with the control relay R3270. The control relay R3270, however, is not energized at this time since the initial operating ground potential applied to the winding of the relay R3260 shunts the winding of the relay R3270. Upon the subsequent restoration of the pulse relay R3315, at its contacts 3317, it removes ground potential from the previously traced initial circuit for energizing the winding of the control relay R3260, whereupon a circuit including the contacts 3232 and 3281, the winding of the control relay R3270, the contacts 3261, and the winding of the relay R3260, is completed for energizing the control relay R3270 and for maintaining the control relay R3260 in its operated position. When the above-described series circuit is completed, the control relay R3270 operates. Upon operating, the control relay R3270, at its contacts 3274, interrupts a point in the previously traced initial energizing circuit for the control relay R3260; and, at its contacts 3273, it prepares a point in a circuit, to be traced hereinafter, for energizing the winding of the control relay R3310. Also, upon operating, the control relay R3270, at its contacts 3275, interrupts a point in the path, traced hereinbefore, for applying ground potential to the hold conductor C3364, thereby to interrupt the previously traced series holding circuit for the tenth stop relay 0K and the cycle relay KD, whereupon the latter relays restore. As a further result of the operation of the control relay R3270, at its contacts 3271, it prepares a point in the circuit for controlling the detector release relay (not shown) in the register translator 1700; and, at its contacts 3272 it removes ground potential from the circuit for controlling the pulse relay R3315, but this is without effect at this time since the circuit for controlling the latter relay is maintained at the contacts 3252.

In response to the next operation of the pulse relay R3315 a circuit is completed, at its contacts 3317, for energizing the winding of the control relay R3310. This circuit may be traced from ground, by way of the contacts 3317, 3223, 3291 and 3273, and the winding of the control relay R3310, to battery. The relay R3310 operates over this circuit and, at its contacts 3311, completes a circuit including the winding of the control relay R3280, but the winding of the latter is short-circuited until ground potential is removed at the contacts 3317 upon the restoration of the pulse relay R3315.

Upon the next restoration of the pulse relay R3315, at its contacts 3317, it interrupts the previously traced circuit for energizing the winding of the control relay R3310, whereupon the short circuit is removed from the winding of the control relay R3280, and the previously mentioned circuit for energizing the winding of the control relay R3310 in series with the winding of the control relay R3280 is completed. When this series circuit is completed the control relay R3310 is retained in its operated position and the control relay R3280 operates. Upon operating, the control relay R3280, at its contacts 3281, interrupts the previously traced holding circuit for energizing in series the windings of the control relays R3260 and R3270, thereby to cause the latter relays to restore; and, at its contacts 3282, it completes a circuit for energizing the winding of the switch relay R3810, thereby to cause the latter relay to operate. Also, the relay R3280, upon operating, at its contacts 3284, interrupts the previously traced circuit for energizing the winding of the mark relay R3290, thereby to cause the latter relay to restore; and, at its contacts 3283, it prepares an alternative circuit, traced hereinafter, for subsequently energizing the winding of the mark relay R3290. Also, upon operating, the control relay R3280, at its contacts 3286, interrupts a further point in the path including the contacts 3318, 3225 and 3243 which was previously completed for short-circuiting the winding of the test relay R3240 prior to the restoration of the pulse relay R3315 after the tenth test lock relay 0S has been operated. The latter arrangement positively prevents the operation of the test relay R3240 prior to the tenth restoration of the pulse relay R3315 during the first test of the detector 2900. Furthermore, the control relay R3280, upon operating, at its contacts 3285, prepares a similar path, including the contacts 3318, 3225, 3285 and 3255, for short-circuiting the winding of the test relay R3250 each time the pulse relay R3315 is in its operated position. This arrangement positively prevents the test relay R3250 from operating while the pulse relay R3315 is in its energized position during the second test by the detector 2900.

As a result of the previously described operation of the switch relay R3710, under control of the contacts 3241 of the test relay R3240, at its contacts 3712, 3714, 3717 and 3719, it interrupts points in the previously traced paths for applying ground potential to the various conductors in the cable 3801, and it prepares, at its contacts 3711, 3713, 3716 and 3718, points in paths, traced hereinafter, for applying ground potential to the various conductors in the cable 3901. Particular attention is directed to the fact that the ground potential applied to the various ones of the marking conductors in the cables 3801 and 3901 is applied to these conductors only momentarily since the cycle relays operate in series with their respective step relays immediately after the energizing ground pulse for operating the step relay is removed by the pulse relay R3315.

As a result of the above-described operation of the switch relay R3810, under control of the contacts 3282 of the control relay R3280, at its contacts 3812, 3814, 3816 and 3818, it interrupts the connections between the first group of WXYZ marking conductors 3801 and the marking contacts of the step relays 0K to 9K, inclusive; and, at its contacts 3811, 3813, 3815 and 3817, it completes obvious connections between the third group of WXYZ marking conductors 3802 and the marking contacts of the step relays 0K to 9K, inclusive.

As a result of the above-described restoration of the mark relay R3290, under control of the contacts 3284 of the control relay R3280, at its contacts 3291 it interrupts a point in the previously traced initial energizing circuit for the winding of the control relay R3310 or R3260, depending upon whether the control relay R3270 is operated or restored. Also, upon restoring, relay R3290 interrupts, at its contacts 3293, the previously traced paths for applying ground potential to the marking conductors C3365 and C3366; and, at its contacts 3292 it reprepares the previously traced path for applying ground potential to the pulse conductor C3363.

As a result of the above-described operation of the control relay R3310, at its contacts 3313, it prepares a point in a path, traced hereinafter, for applying ground potential to the marking conductors C3365 and C3367; and, at its contacts 3314, it applies ground potential to the conductor C3368, thereby to complete an energizing circuit for the winding of one of the ten D relays 0D to 9D, inclusive, depending upon the particular operated one of the ten test lock relays 0S to 9S, inclusive. In the present example, the tenth test lock relay 0S occupies its operated position and, accordingly, the application of ground potential to the conductor C3368 is extended by way of the contacts 0S4, the conductor C3700 of the cable 3701, and the winding of the tenth D relay 0D, to battery. When thus energized the tenth D relay 0D operates to connect the tenth group of 100 test leads to the riser cable 3000, for a purpose more fully explained hereinafter.

Each time the pulse relay R3315 now operates and restores it completes and then interrupts, at its contacts 3317, the previously traced path for applying ground potential to the pulse conductor C3363, whereby the step relays 1K, 2K, etc., are operated sequentially and locked in series with the associated cycle relay KA, KB, KC or KD, in the manner previously explained. At this time the first step relay 1K upon operating, at its contacts 1K1, completes a circuit, including the contacts KA5 and 3716, for applying ground potential to the first conductor in the marking cable 3901, thereby to complete an energizing circuit for the first E relay 1E in the associated group of ten E relays. As a result of the operation of the first E relay in the group, the first group of ten conductors in the riser cable 3000 is tested. The group mentioned comprises one of ten groups of ten conductors in the riser cable 3000 which is connected, by way of the operated tenth D relay 0D, to the tenth group of 100 test leads which is connected by way of the operated tenth A relay 00A to the "0" hundred group of S leads in the "0" thousand group. This group of S leads includes the S lead S433 extending to the line switch 423 individually associated with the calling private subscriber line 407, as previously noted.

Similarly, upon operating, the second step relay 2K completes, at its contacts 2K1, a circuit including the contacts KB5 and 3713 for applying ground potential to the second conductor in the marking cable 3901, thereby to complete a circuit for energizing the winding of the second E relay 2E in the associated group of ten E relays, in order to cause the latter relay to operate, whereby the second group of ten conductors in the riser cable 3000 is tested, in the manner explained above. Finally, the ninth step relay 9K completes, at its contacts 9K1, a circuit including the contacts KC5 and 3711 for applying ground potential to the ninth marking conductor C3819 in the marking cable 3901, thereby to complete a circuit for energizing the winding of the ninth E relay 9E in the associated group of ten E relays, in order to cause the latter relay to operate, whereby the ninth group of ten conductors in the riser cable 3000 is tested.

More particularly, when the ninth E relay 9E operates, at its associated contacts it completes connections between the ten conductors in the ninth group of ten conductors in the riser cable 3000 and the respective ten test conductors C3500 to C3509, inclusive. At this time the tenth group ("0" hundred) of 100 S leads in the "0" thousand group is connected, by way of the operated tenth A relay 00A, to the corresponding tenth group of 100 test leads; the ten groups of ten test conductors in the tenth group of 100 test conductors are connected by the operated tenth D relay 0D to the ten groups of ten conductors in the riser cable 3000; and the ten conductors in the ninth group of conductors in the riser cable 3000 are respectively connected by the ninth E relay 9E to the respective ten test conductors C3500 to C3509, inclusive. Hence, at this time a circuit is completed for operating the ninth amplifier 9AMP in the view of the fact that the S lead S433 extending to the line switch 423, individually associated with the private subscriber line 407, has a tone signal applied thereto, the last two digits of the numerical portion of the directory number of the private subscriber line 407 being "99."

The ninth amplifier 9AMP operates, in response to the tone signal transmitted over the conductor C3509, and causes the operation of the ninth test stop relay 9R. Upon operating, the relay 9R, at its contacts 9R2, completes a circuit, including the contacts 3312, for energizing the left-hand winding of the test mark relay 9T. When thus energized the test mark relay 9T operates to complete, at its contacts 9T1, a circuit, including the contacts 3233, for energizing the right-hand winding thereof in series with the test relay R3250. When this series circuit is completed, the test mark relay 9T is retained in its operated position and the test relay R3250 operates. At this point it is noted that the test relay R3250 is short-circuited from ground at the contacts 3233 by way of the winding of the test relay R3250, and the contacts 3255, 3285, 3225 and 3318, each time the pulse relay R3315 is operated, and the short-circuit is removed therefrom each time the pulse relay R3315 restores. Consequently, the test relay R3250 is not operated in the manner described above until after the ninth restoration of the pulse relay R3315. When the test relay R3250 operates, at its contacts 3255, it interrupts a further point in the above-mentioned circuit for short-circuiting the winding thereof; and, at its contacts 3254, it completes a circuit, including the contacts 3283, for energizing the winding of the mark relay R3290, thereby to cause the latter relay to operate.

When the mark relay R3290 is thus operated, at its contacts 3292 it interrupts a further point in the previously mentioned path for applying ground potential to the pulse conductor C3363, thereby positively to arrest further operation of the step relays 0K to 9K, inclusive, at this time. Also, at its contacts 3291, the mark relay R3290 prepares a further point in the previously mentioned circuit for energizing the winding of the control relay R3260; and, at its contacts 3293, it completes the previously mentioned path for applying ground potential to the marking conductors C3365 and C3367. The application of ground potential to the marking conductor C3365 is effective to complete a path for applying ground potential to certain of the WXYZ conductors in the third group of marking leads 3802, depending upon the particular operated one of the step relays 0K to 9K, inclusive, at this time. In the present example the ninth step relay 9K occupies its operated position over a holding circuit including the winding of the cycle relay KC. Accordingly, the ground potential appearing upon the marking conductor C3365 is applied by way of the contacts 9K5 and 3813 to the Y conductor in the third group of marking leads 3802. The application of ground potential to the Y conductor in the third group of marking leads 3802 corresponds to the digit "9" and causes the digit "9" to be registered in the third code storage device S2803 in the register translator 1700, in the manner previously explained. The application of ground potential to the conductor C3367 is effective to complete a path for applying ground potential to certain of the WXYZ conductors in the fourth group of marking leads 3801, depending upon the particular operated ones of the test mark relays 0T to 9T, inclusive, at this time. The particular one of the test mark relays which is operated at the present time is the test mark relay 9T which was operated under control of the ninth amplifier 9AMP during the above-described test operation of the detector 2900. Consequently, the ninth test mark relay 9T occupies its operated position over a series holding circuit which includes its right-hand winding and the winding of the test relay R3250. Hence, in the present example, the ground potential appearing upon the marking conductor C3367 is applied by way of the contacts 9T2 to the Y conductor in the fourth group of marking leads 3801. The application of ground potential to the Y conductor in the fourth group of marking leads 3801 corresponds to the digit "9" and is effective to cause the digit "9" to be registered in the fourth code storage device S2804 in the register translator 1700.

Upon the next operation of the pulse relay R3315, at its contacts 3317, it completes the previously mentioned circuit, including the contacts 3223, 3291 and 3274, for energizing the winding of the control relay R3260, thereby to cause the latter relay to operate and complete, at its contacts 3261, a circuit path, including the winding of the control relay R3270, the contacts 3253 and ground at the contact 3232, for short-circuiting the winding of the control relay R3270. Upon the next restoration of the pulse relay R3315, at its contacts 3317, the previously traced original operating circuit for energizing the winding of the control relay R3260 is interrupted, whereupon the short-circuit is removed from the control relay R3270, and the latter relay energizes in series with the winding of the control relay R3260. When this circuit is completed, the control relay R3260 is retained in its operated position and the control relay R3270 operates.

The control relay R3270, upon operating, at its contacts 3275, interrupts the previously mentioned path for applying ground potential to the hold conductor C3364, thereby to interrupt the series holding circuit, including the winding of the ninth step relay 9K and the winding of the cycle relay KC whereupon the latter relays restore to normal. Also the control relay R3270, at its contacts 3272, interrupts a further point in the path for energizing the pulse relay R3315, the multiple operating ground for the pulse relay R3315 having been removed at the contacts 3252 in response to the operation of the test relay R3250. Consequently, the operation of the test relay R3250 and the control relay R3270 interrupts, at the contacts 3252 and 3272, respectively, the circuit for the pulse relay R3315, thereby positively to arrest further operation of the latter relay at this time. The relay R3270, at its contacts 3273, prepares a point in the control circuit for the relay R3310 but this circuit is without effect at this time due to the fact that the operation of the pulse relay R3315 has been arrested; and finally, at its contacts 3271, the relay R3270 completes a circuit path, including the contacts 3251, for applying ground potential to the conductor C3201 extending to the register translator 1700.

The application of ground potential to the conductor C3201 extending to the register translator 1700 effects the disconnection of the detector 2900 from the register translator 1700. More specifically, the application of ground potential to the conductor C3201 causes a detector release relay (not shown) in the register translator 1700 to operate whereby ground potential is removed from the start conductor C3202 and battery potential is removed from the test conductor C3101 in order to effect the restoration of the start relay R3210 and the stop relay R3220 in the detector 2900. Also, the storage relay R2850 in the register translator 1700 restores thereby to interrupt, at its contacts 2852, the previously traced test circuit including the S conductor S433 extending to the line switch 423 individually associated with the private subscriber line 407 whereupon the ninth amplifier 9AMP in the detector 2900 is released in order to effect the restoration of the ninth test stop relay 9R in an obvious manner. The register translator 1700 also interrupts the circuit for applying ground potential to the hold conductor C3401 extending to the detector 2900. As a further result of the restoration of the storage relay R2850, it disconnects the four groups of WXYZ marking leads 3501, 3602, 3701 and 3801 from the respective code storage devices S2804, S2803, S2802 and S2801 in the register translator 1700. Finally, the storage relay R2850 disconnects the hold conductors C3401 to C3404, inclusive, extending to the detector 2900 from the register translator 1700.

Continuing now with the release of the detector 2900, when ground potential is removed from the start conductor C3202 the start relay R3210 restores, thereby to interrupt, at its contacts 3212, the previously traced holding circuit for energizing the winding of the cycle relay FD in series with the winding of the finder relay 6F, thereby to cause the latter relays to restore. Also, the relay R3210, at its contacts 3211, interrupts a further point in the previously traced energizing circuit for the pulse relay R3315. As a result of the restoration of the stop relay R3220, at its contacts 3222, it interrupts the circuit for the hold relay R3230, whereupon the latter relay also restores. Upon restoring, the hold relay R3230, at its contacts 3232, interrupts the previously traced series circuit for the control relays R3260 and R3270 and the previously traced series holding circuit for the control relay R3280 and the control relay R3310, thereby to cause the latter relays to restore to normal. Also, the hold relay R3230, at its contacts 3233, interrupts the previously traced holding circuit for energizing the winding of the test relay R3240 in series with the right-hand winding of the test lock relay 9S, and the previously traced multiple holding circuit for energizing the test relay R3250 in series with the right-hand winding of the ninth test mark relay 9T, thereby to cause the relays mentioned to restore to normal. When the control relay R3270 restores to normal, at its contacts 3271, it interrupts the previously mentioned path for applying ground potential to the conductor C3201 extending to the register translator 1700. As a result of the restoration of the test relay R3240, at its contacts 3241, it interrupts the previously traced circuit for energizing the winding of the switch relay R3110, thereby to cause the latter relay to restore. The control relay R3280, upon restoring, at its contacts 3282, interrupts the previously traced circuit for energizing the winding of the switch relay R3810, thereby to cause the latter relay to restore. When the tenth test lock relay 0S restores to normal, at its contacts 0S5, it interrupts the previously traced holding circuit for energizing the winding of the tenth A relay 0A, thereby to cause the latter relay to restore; and, at its contacts 0S4, it interrupts the previously traced holding circuit for energizing the winding of the tenth D relay 0D, thereby to cause the latter relay to restore. Finally, when the ninth step relay 9K restores it interrupts, at its contacts 9K1, a further point in the previously traced circuit for momentarily energizing the winding of the ninth E relay 9E, thereby to cause the latter relay to restore. At this time the detector 2900 is completely released and is available for further use.

In view of the foregoing explanation of the mode of operation of the detector 2900, it will be understood that it operated to detect the numerical portion of the directory number of the private subscriber line 407 extending to the calling private subscriber substation TP, and effected the registration of the detected numerical portion of the directory number mentioned in the code storage devices S2801 to S2804, inclusive, in the register translator 1700. More particularly, at this time the four digits "0099" representing the numerical portion of the directory number of the private subscriber line 407 are respectively registered in the code storage devices S2801 to S2804, inclusive, in the register translator 1700.

In view of the foregoing explanation of the mode of operation of the detector 2900 to detect the numerical portion of the directory number of the calling subscriber line 407, it will be understood that the step relays 0K to 9K, inclusive, are operated through a first cycle to detect the thousand digit of the directory number in conjunction with the amplifiers 0AMP to 9AMP, inclusive, which detect the hundred digit in the directory number, and then the step relays 0K to 9K, inclusive, are operated through a second cycle to detect the ten digit of the directory number in conjunction with the amplifiers 0AMP to 9AMP, inclusive, which, during the second cycle, detect the unit digit of the directory number. During either the first test or the second test of the step relays 0K to 9K, inclusive, should these relays operate through a first complete cycle and fail to make a detection, in the manner explained above, a second operation thereof would be initiated.

For example, if at the beginning of the second cycle of the operation of the step relays 0K to 9K, inclusive, a tone signal has not been received by the amplifiers 0AMP to 9AMP, inclusive, the mark relay R3290 is not operated and, consequently, the control relays R3260 and R3270 remain in their restored positions. As a result thereof the ground potential applied, by way of the contacts 3232 and 3275, to the hold conductor C3364 maintains the cycle relay KD in its operated position in series with the tenth step relay 0K. At its contacts KD6 the cycle relay KD prepares a circuit for the first test relay R3340. If the next pulse is received over the conductor C3364 at the beginning of the second cycle of operation of the step relays 0K to 9K, inclusive, the first step relay 1K would operate while the tenth step relay 0K and the cycle relay KD occupy their operated positions. In this event, upon operating, the first step relay 1K completes, at its contacts 1K7, a circuit, including the contacts KD6 and 3346, for energizing the winding of the first test relay R3340, thereby to cause the latter relay to operate. Upon operating, the first test relay R3340 completes, at its contacts 3341, an obvious path, including the grounded hold conductor C3364, for short-circuiting the winding of the lock relay R3345. When ground is removed from the conductor C3363 at the end of the first pulse, the step relay 1K is maintained in its operated position over a circuit which includes the winding of the cycle relay KA. The cycle relay KA is operated over this circuit and, at its contacts KA4, interrupts the series circuit including the windings of the cycle relay KD and the step relay 0K, causing the latter relays to restore to normal. When the cycle relay KD restores it interrupts, at its contacts KD6, the above-traced initial circuit for energizing the winding of the first test relay R3340, whereupon a series circuit, including the grounded hold conductor C3364, the winding of the lock relay R3345, the contacts 3341, and the winding of the first test relay R3340, is completed for energizing the relays mentioned. When this series circuit is completed the first test relay R3340 is retained in its operated position and the lock relay R3345 operates. Upon operating, the lock relay R3345, at its contacts 3346, interrupts a further point in the previously traced initial energizing circuit for the first test relay R3340; and, at its contacts 3347, it prepares a point in a circuit, traced hereinafter, for energizing the winding of the second test relay R3350.

During the second cycle of operation mentioned of the step relays 0K to 9K, inclusive, in the event a detection is made by one of the ten amplifiers 0AMP to 9AMP, inclusive, the mark relay R3290 operates and, in turn, causes the operation of the control relays R3260 and R3270. The control relay R3270, upon operating, at its contacts 3275, interrupts the previously traced path for applying ground potential to the hold conductor C3364, as previously explained, whereby the previously traced holding circuit for energizing the winding of the lock relay R3345 in series with the winding of the first test relay R3340 is interrupted in order to cause the latter relays to restore. Also, incident to the foregoing operation of removing ground potential from the conductor C3364, the operated one of the step relays 0K to 9K, inclusive, and the operated one of the cycle relays KA, KB, KC and KD are restored, all in the manner previously explained. On the other hand, in the event no detection is made by the amplifiers 0AMP to 9AMP, inclusive, during the second cycle of operation of the step relays 0K to 9K, inclusive, a third cycle of operation thereof is initiated. At the beginning of the third cycle of operation of the cycle relays 0K to 9K, inclusive, the first step relay 1K is operated by a ground pulse transmitted over the conductor C3363 while the tenth step relay 0K and the associated cycle relay KD occupy their operated positions. In this event the first step relay 1K, upon operating at the contacts 1K7, completes the previously mentioned circuit, including the contacts KD6 and 3347, for energizing the winding of the second test relay R3350. When thus energized the second test relay R3350 operates to complete, at its contacts 3354, a locking circuit for itself, including the grounded hold conductor C3364. Also, the second test relay R3350 completes, at its contacts 3353, an obvious circuit for energizing the winding of the alarm relay R3360, thereby to cause the latter relay to operate and complete, at its contacts 3361, an obvious locking circuit for itself, including the reset key K3370. Also, the alarm relay R3360, at its contacts 3362, completes an obvious circuit for operating the alarm A3375, thereby to indicate to the exchange attendant that the detector 2900 has operated and failed to detect the directory number of a calling subscriber line. Further, the second test relay R3350, at its contacts 3352, interrupts the previously traced circuit for energizing the pulse relay R3315, thereby to arrest further operation of the latter relay at this time. Finally, the second test relay R3350 completes, at its contacts 3351, a circuit for applying ground potential to the conductor C3301 extending to the register translator 1700.

The application of ground potential to the conductor C3301 extending to the register translator 1700 causes the register translator 1700 to register the failure of the detector 2900, whereby ground potential is removed from the start conductor C3202 and battery potential is removed from the test conductor C3101 in order to effect the restoration of the start relay R3210 and the stop relay R3220 in the detector 2900 and the consequent release of the detector 2900, in the manner previously explained. Also, the registration of the failure of the detector 2900 in the register translator 1700 effects certain operations of the apparatus therein disclosed in order to cause the call initiated by the calling private subscriber at substation TP to be routed to an operator's position for interception.

The exchange attendant may replace the detector 2900 in service by momentarily operating the reset key K3370, thereby to interrupt the previously mentioned holding circuit for the alarm relay R3360 in order to cause the latter relay to restore. Upon restoring, the alarm relay R3360, at its contacts 3362, interrupts the previously mentioned circuit for operating the alarm A3375 and, at its contacts 3361, it interrupts a further point in the previously traced holding circuit for itself, including the key K3370. It may be well to mention at this time, however, that the restoration of the stop relay R3220 caused the hold relay R3230 to restore, and the latter relay, at its contacts 3232, removes the holding ground from the conductor C3364 to permit the second test relay R3350, and other relays which may be held in their operated position from ground on this conductor, to restore to normal.

In view of the foregoing explanation of the mode of operation of the detector 2900 to detect the directory number of the called private subscriber substation TP connected to the calling private subscriber line 407 as 0099, it will be understood that the detector 2900 is operative in a substantially identical manner to detect the directory number of any calling subscriber substation in exchange 4 zone 94. For example, the detector 2900 is operative to detect the directory numbers of the calling party subscriber substations TS1, TS2, TS3 and TS4 connected to the party subscriber line 410 as 0100, 0200, 0300 and 0400. By way of illustration it is pointed out that when the calling fourth party subscriber substation TS4 initiates a metropolitan toll call, the register translator 1700 operates to cause a ground potential to be applied to the fourth hold conductor C3404 whereby only the fourth A relay 04A in the "0" thousand group of A relays operates incident to the operation of the tenth B relay 9B in the detector 2900. The operation of the fourth A relay 04A in the "0" thousand group of A relays connects the S conductor S434, extending to the line switch 424 individual to the party subscriber line 410, to the fourth group of 100 test conductors, whereby the fourth amplifier 4AMP is operated in conjunction with the tenth step relay 0K in order to arrest the first test cycle of operation of the detector 2900, thereby to identify the thousand digit and the hundred digit of the calling party subscriber substation TS4 respectively as "0" and "4." The subsequent operation of the detector 2900 to detect the ten and unit digits of the directory number of the calling party subscriber substation TS4 respectively as "0" and "0" is the same as that previously described whereby the complete directory number of the calling party subscriber substation TS4 is detected as 0400.

*Detailed operation of the tenth amplifier 0AMP and the oscillator*

Figure 5:
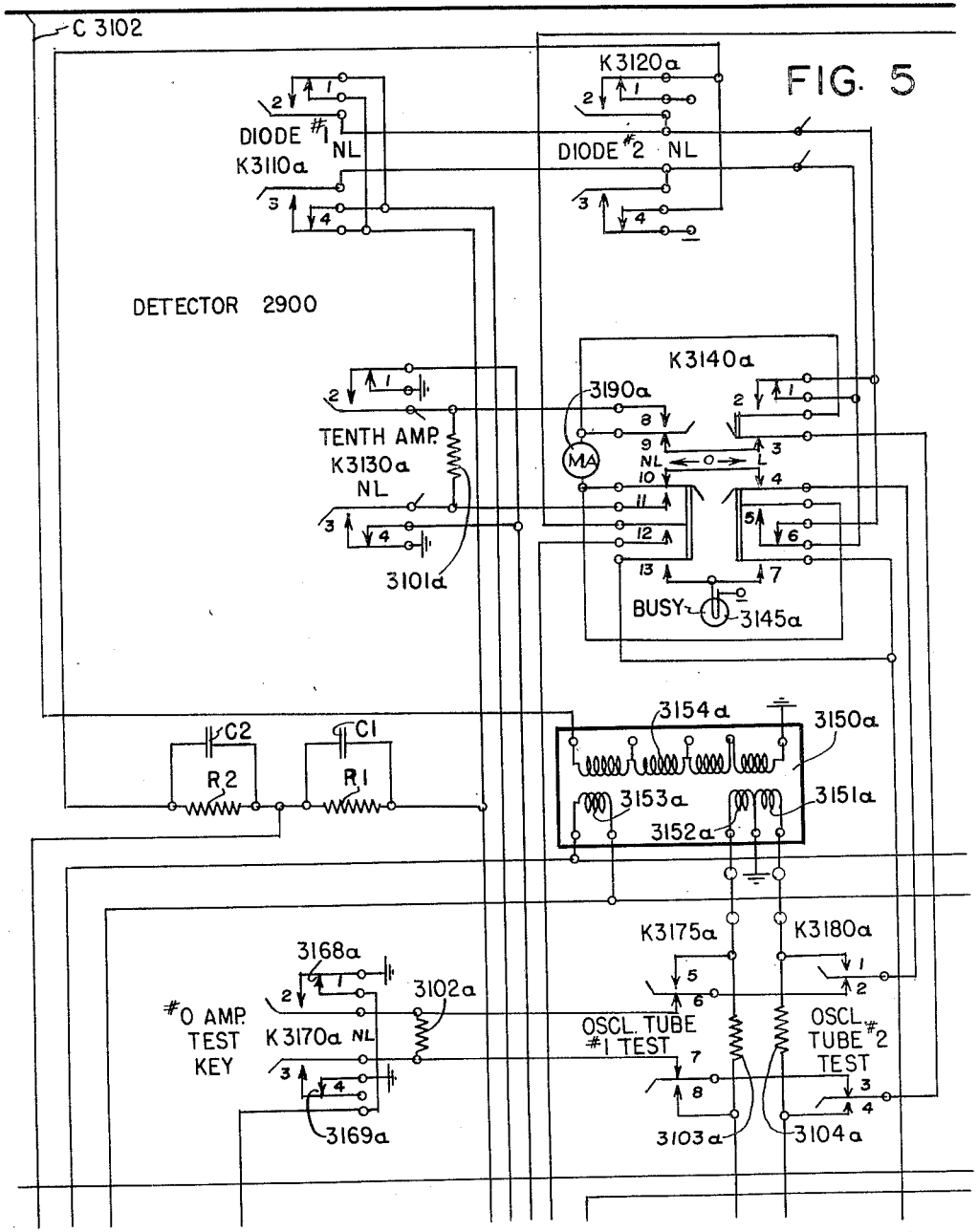
Figure 11:
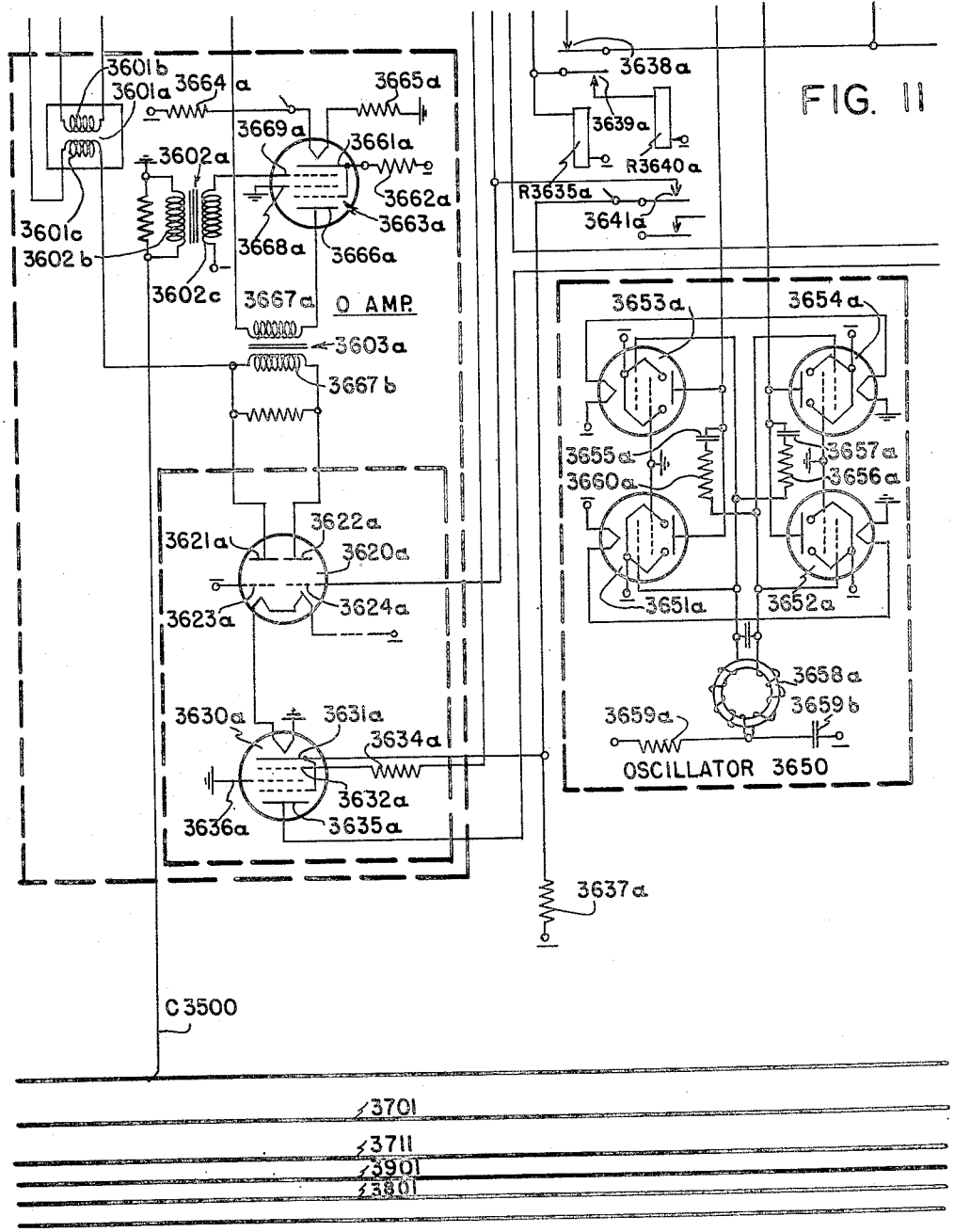
Figure 12:
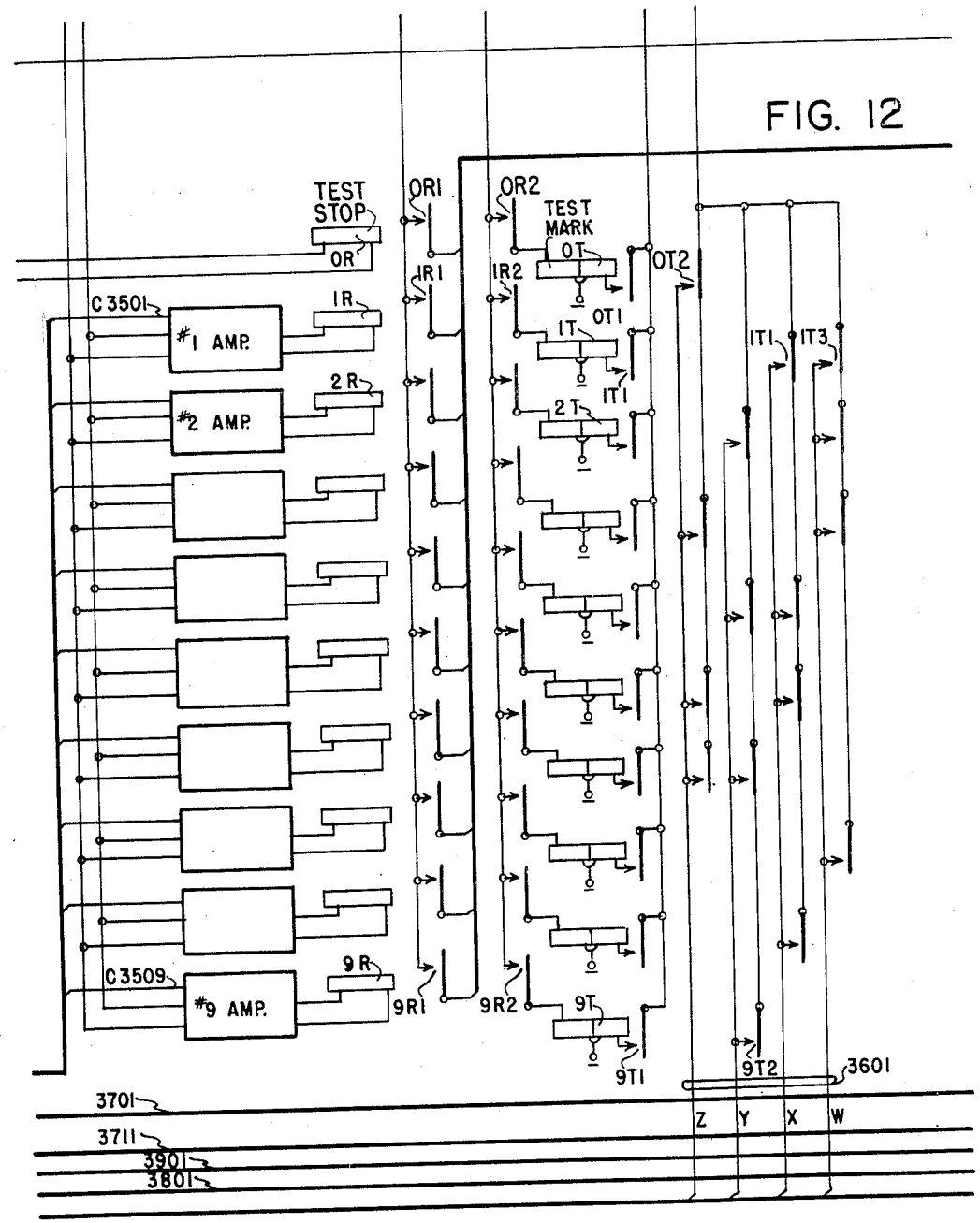
Figure 13:
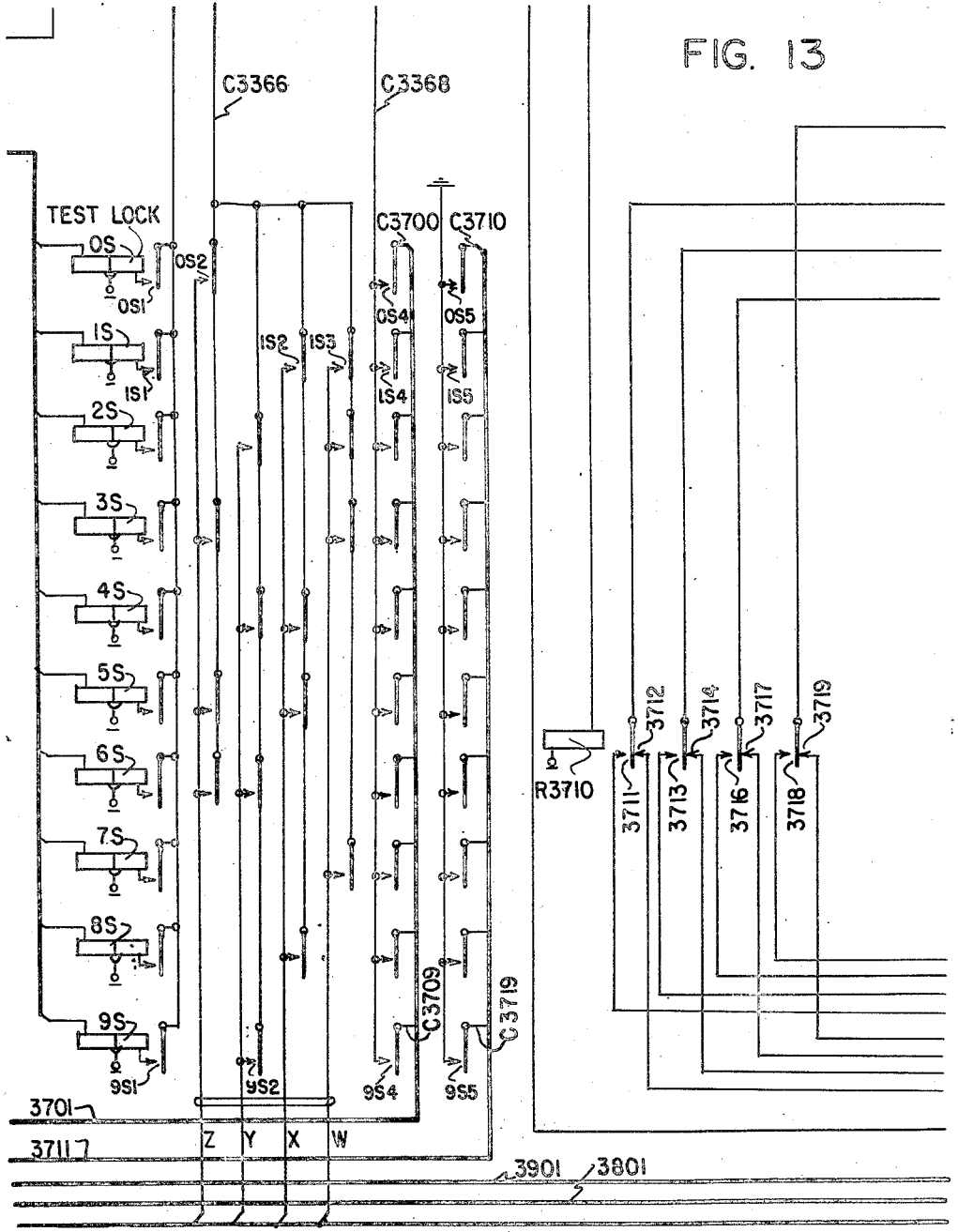

Referring to Figs. 5 and 11 of the detector 2900, it is noted that the push-pull oscillator 3650 comprises a pair of vacuum tubes 3651a and 3652a which are connected in such a manner that a portion of the output of the tube 3651a is fed to the control grid of the tube 3652a, and a portion of the output of the tube 3652a is in turn fed to the control grid of the tube 3651a. Also, it is noted that a pair of auxiliary vacuum tubes 3653a and 3654a are connected in parallel respectively with the tubes 3651a and 3652a, in order to provide an auxiliary push-pull oscillator which is connected in multiple with the push-pull oscillator comprising the tubes 3651a and 3652a. In this circuit the control grids of the tubes 3651a to 3654a, inclusive are biased negatively over a circuit including negative battery connected in series with the grid leak 3659a, which, in turn, is shunted by the grid condenser 3659b and the windings of the loading coil 3658a. Negative potential is also applied to the cathodes of the various tubes, and the screen grids thereof are respectively connected to ground potential. The filament circuits for the tubes 3651a and 3652a and the tubes 3653a and 3654a are respectively connected in series so that in the event the filament of one tube of the pair burns out the associated tube, included in that filament circuit of the burned-out tube, is automatically rendered ineffective. The anode electrodes of the tubes 3652a and 3654a are multiply connected by way of the resistor 3104a and the right-hand winding 3151a of the transformer 3150a to ground, and the anode electrodes of the tubes 3651a and 3653a are multiply connected by way of the resistor 3103a and the left-hand winding 3152a of the transformer 3150a to ground. Accordingly, the combined output of the tubes 3651a and 3653a includes the left-hand winding 3151a of the transformer 3150a, and the combined output of the tubes 3652a and 3654a includes the right-hand winding 3151a of the transformer 3150a. It is to be noted, however, that a portion of the combined output of the tubes 3652a and 3654a is fed by way of the condenser 3657a and the resistor 3656a to the control grids of the tubes 3651a and 3653a. Also, it is noted that a portion of the combined output of the tubes 3651a and 3653a is fed by way of the condenser 3655a and the resistor 3660a to the control grids of the tubes 3652a and 3654a. The principle of operation of a push-pull oscillator of the type described is well known and it is not deemed necessary to describe the detailed operation thereof herein. It may be mentioned, however, that conduction is alternately switched from one set of tubes to the other set so that continuous oscillation is maintained at a rather high frequency. In the push-pull oscillator described above, the values of the component parts thereof have been selected so that the frequency derived at the transformer 3150a is such that a tone signal in the order of 5,000 cycles per second is obtained. The transformer 3150a is so arranged that the 5,000 cycle tone signal generated in the windings 3151a and 3152a thereof is transmitted by induction through the winding 3154a of the transformer 3150a over the conductor C3102 extending to the register translator 1700. In addition thereto the 5,000 cycle tone signal generated in the windings 3151a and 3152a of the transformer 3150a is transmitted by induction through the winding 3153a of the transformer 3150a to the multiply connected tone signal transformers of the ten amplifiers 0AMP to 9AMP, inclusive. In the present example, the tone signal transformer 3601a of the tenth amplifier 0AMP is illustrated in detail and the remaining nine amplifiers 1AMP to 9AMP, inclusive, have been diagrammatically illustrated.

Considering now in greater detail the operation of the tenth amplifier 0AMP illustrated, it is noted that this amplifier constitutes one of the ten amplifiers or detector units. In the amplifier or detector unit 0AMP the cathode 3661a of the driver tube 3663a is heated by an associated heater provided with a normally completed circuit including the resistors 3664a and 3665a, whereby the cathode 3661a is rendered electron emissive. The plate 3666a of the driver tube 3663a is connected by way of the primary winding 3667a of the coupling transformer 3603a to ground potential, by way of the contacts 3168a and 3169a of the 0AMP test key K3170a. The screen grid 3668a of the driver tube 3663a is connected directly to ground potential, while the control grid 3669a of the driver tube 3663a is connected by way of the secondary winding 3602c of the coupling transformer 3602a, to battery potential. Accordingly, the control grid 3669a is normally biased to a negative potential with respect to the cathode 3661a by an amount equal to the voltage drop across the cathode biasing resistor 3662a, which is voltage sufficient to bias the driver tube 3663a to approximately the midpoint of the linear portion of its operating characteristic.

It will be recalled that the oscillator 3650 operates to supply 5,000 cycle alternating current to the windings 3151a and 3152a of the coupling transformer 3150a, whereby the 5,000 cycle alternating current traverses the winding 3153a of the transformer 3150a and the winding 3601b of the coupling transformer 3601a in the amplifier 0AMP. The 5,000 cycle alternating current traversing the primary winding 3601b of the coupling transformer 3601a induces a corresponding alternating voltage in the secondary winding 3601c thereof. One terminal of the secondary winding 3601c of the coupling transformer 3601a is connected to the midpoint between the resistors R1 and R2 and to the midpoint between the condensers C1 and C2, while the other terminal of the secondary winding 3601c of the coupling transformer 3601a is connected directly to the plate 3621a of the rectifier tube 3620a, and via the secondary winding 3667b of the coupling transformer 3603a to the plate 3622a of the rectifier tube 3620a. The resistor R1 and the condenser C1 are connected in parallel, and the resistor R2 and the condenser C2 are connected in parallel to form a bridge circuit, one terminal of this bridge circuit being common to the resistor R1 and the condenser C1 and being connected to the cathode 3624a of the rectifier tube 3620a by way of the normally closed contacts of the diode 1 key K3110a; the other terminal of this bridge circuit being common to the resistor R2 and the condenser C2 and being connected to negative battery potential by way of the normally closed contacts of the diode 2 key K3120a. Also, the cathode 3623 of the rectifier tube 3620a is connected to negative battery potential. The cathode heaters of the respective cathodes 3623a and 3624a of the rectifier tube 3620a and the cathode heater of the amplifier tube 3630a are included in a normally completed series circuit, whereby the cathodes of the rectifier tube 3620a and the cathode of the amplifier tube 3630a are rendered electron emissive.

Accordingly, the rectifier tube 3620a is rendered conductive and current flows through both of the space current paths therein. More particularly, on each half-cycle of the alternating voltage induced in the secondary winding 3601c of the coupling transformer 3601a an induced current flows over the circuit path including the negative battery potential applied to the normally closed contacts of the diode 2 key K3120a by way of the resistor R2, the secondary winding 3601c of the coupling transformer 3601a, the space current path between the plate 3621a and the cathode 3623a of the rectifier tube 3620a, and the negative exchange battery. Also on each half-cycle of alternating voltage induced in the secondary winding 3601c of the coupling transformer 3601a, an induced current flows over the circuit including the secondary winding 3667b of the coupling transformer 3603a, the space current path between the plate 3622a and the cathode 3624a of the rectifier tube 3620a, the normally closed contacts of the diode 1 key K3110a, and the resistor R1, and returning by way of the resistor R1 to the secondary winding 3601c of the coupling transformer 3601a. Accordingly, the alternating voltage induced in the secondary winding 3601c of the coupling transformer 3601a causes rectified current to traverse the two multiple space current paths, through the rectifier tube 3620a, which respectively include the resistors R2 and R1. At this point it is noted that the resistance values of the resistors R1 and R2 are substantially equal and are exceedingly high with respect to the impedance value of the secondary winding 3667b of the coupling transformer 3603a, whereby the currents traversing the two parallel paths, respectively including the two resistors R2 and R1, are substantially equal. Hence the voltage drop across the resistor R1 is substantially equal to the voltage drop across the resistor R2, these voltage drops being in opposite directions due to the flow of current in the two multiple paths through the respective resistors R1 and R2 to the negative terminal of the secondary winding 3601c of the coupling transformer 3601a. Accordingly, it will be understood that the condenser C1 bridged across the resistor R1 and the condenser C2 bridged across the resistor R2 are charged to two substantially equal and opposite voltages.

In the amplifier tube 3630a the cathode 3631a is connected by way of the resistor 3637a to battery potential, and the plate 3635a is connected by way of the winding of the tenth test stop relay 0R and the normally closed contacts of the tenth amplifier key K3130a to ground potential. Also, the screen grid 3636a of the amplifier tube 3630a is connected directly to ground potential, while the control grid 3632a of the amplifier tube 3630a is connected by way of the resistor 3634a, the condensers C1 and C2 in series, and the normally closed contacts of the diode 2 key K3120a to battery potential. Accordingly, the control grid 3632a is biased to a negative potential with respect to the cathode 3631a due to the provision of the cathode biasing resistor 3637a, whereby the amplifier tube 3630a is normally rendered substantially non-conductive. More particularly, it is noted that in the amplifier tube 3630a, the control grid 3632a is normally biased negatively with respect to the cathode 3631a due to the provision of the cathode biasing resistor 3637a connected between the cathode 3631a and battery potential. This bias of the control grid 3632a with respect to the cathode 3631a of the amplifier tube 3630a is normally maintained due to the fact that equal and opposite voltages normally appear across the condensers C1 and C2 when the two parallel paths through the rectifier tube 3620a conduct equal currents, as previously noted.

Accordingly, when the operation of the detector 2900 is originally initiated, operation of the various amplifiers, including the tenth amplifier 0AMP, is initiated, whereby in the tenth amplifier 0AMP the rectifier tube 3620a and the driver tube 3663a are rendered conductive and the amplifier tube 3630a is rendered substantially non-conductive. Hence, the tenth test stop relay 0R remains in its restored position. Also, the 5,000 cycle alternating voltage induced in the secondary winding 3145a of the coupling transformer 3150a is impressed upon the conductor C3102, for the purpose previously noted.

During operation of the detector 2900 when the one of the ten B relays 0B to 9B, inclusive, corresponding to the thousand terminal group including the calling line terminal, operates, one of the ten amplifiers 0AMP to 9AMP, inclusive, corresponding to the hundred line group including the calling line terminal, also operates. For example, assuming that a call is initiated at the calling subscriber substation TP and that the detector 2900 is operating to detect the directory number thereof, in the manner previously explained, when the tenth B relay 0B operates, the tenth A relay 0A in the associated group also operates to complete the previously traced connection between the conductor C3102 and the primary winding 3602b of the coupling transformer 3602a in the tenth amplifier 0AMP. The above-mentioned circuit extends, when completed, from ground by way of the winding 3154a of the coupling transformer 3150a, to the conductor C3102 extending to the register translator 1700 and then over the previously traced path to the S lead S433 associated with the subscriber line 407. The circuit then extends from the S lead S433 to the lefthand contact of the tenth A relay 0A, a conductor in the "0" hundred group of 100 test leads, a contact of the tenth C relay 0C, the tenth test conductor C3500 extending by way of the primary winding 3602b of the coupling transformer 3602a and the connected multiple resistor in the tenth amplifier 0AMP to ground potential. When the above-traced series circuit is completed, 5,000 cycle alternating current is transmitted thereover by induction from the primary winding 3151a associated with the oscillator 3650 and traverses the primary winding 3602b of the coupling transformer 3602a in the amplifier 0AMP. The alternating current traversing the primary winding 3602b of the coupling transformer 3602a is induced in the secondary winding 3602c and is amplified through the driver tube 3603a, and appears as an induced voltage in the secondary winding 3607b of the coupling transformer 3603a. In this regard it is noted that the phase shift produced between the voltage across the secondary winding 3154a of the coupling transformer 3150a and the voltage across the primary winding 3602b of the coupling transformer 3602a by the shunt and series impedance of the above-traced signal circuit is substantially negligible. Accordingly, the voltage induced in the secondary winding 3607b from the primary winding 3607a of the coupling transformer 3603a is substantially in phase with the voltage applied to the plate 3622a of the rectifier tube 3620a from the secondary winding 3601c of the coupling transformer 3601a. Hence, it will be understood that the voltage between the plate 3622a and the cathode 3624a of the rectifier tube 3620a is considerably increased while the voltage between the plate 3621a and the cathode 3623a of the rectifier tube 3620a is not materially affected. Accordingly, the current traversing the first space current path through the rectifier tube 3620a, including the resistor R1 in the bridge circuit, is substantially greater than the current traversing the second space current path through the rectifier tube 3620a, including the resistor R2 in the bridge circuit. Hence, the voltage drop across the resistor R1 will be considerably greater than that across the resistor R2 in the bridge circuit. Thus, the bridge circuit is unbalanced, causing the condenser C1 to be charged to a greater voltage than the condenser C2.

After a predetermined number of cycles of alternating current has been generated by the oscillator 3650 and has been received by the tenth amplifier 0AMP, the charge upon the condenser C1 will be built up considerably more than the charge upon the condenser C2, whereby the voltage across the condenser C1 will considerably predominate over the voltage across the condenser C2. When this occurs, the predominant voltage across the condenser C1 renders the control grid 3632a less negative with respect to the cathode 3631a of the amplifier tube 3630a. When the grid 3632a becomes less negative than the cathode 3631a the amplifier tube 3630a is rendered conductive, whereby the winding of the tenth test stop relay 0R is sufficiently energized to cause operation thereof. Upon operating, the tenth test stop relay 0R causes the first cycle of the detector 2900 to be arrested, in the manner previously explained. The circuit for energizing the winding of the tenth test stop relay 0R extends from ground potential by way of the normally closed contacts of the tenth amplifier key K3130a, the winding of the test stop relay 0R, the plate 3635a and the cathode 3631a of the amplifier tube 3630a, and the resistor 3637a to battery.

At the conclusion of the first cycle of operation of the detector 2900, each of the ten C relays 0C to 9C, inclusive, restores, thereby to interrupt the previously traced circuit for energizing the primary winding 3602b of the coupling transformer 3602a, with alternating current from the secondary winding 3154a of the coupling transformer 3150a, as previously explained. When the primary winding 3602b of the coupling transformer 3602a is thus deenergized, the voltage impressed between the plate 3622a and the cathode 3624a is rendered substantially equal to that impressed between the plate 3621a and the cathode 3623a, whereby the current traversing the two space current paths through the rectifier tube 3620a is again balanced, causing equal currents to traverse the resistors R1 and R2. At this time substantially equal and opposite voltages again appear across the condensers C1 and C2, whereby the control grid 3632a of the coupling tube 3630a is again biased sufficiently negative with respect to the cathode 3631a to effect the restoration of the tenth test stop relay 0R.

In view of the foregoing explanation of the mode of operation of the tenth amplifier or detector unit 0AMP in the detector 2900, it will be understood that this unit is effective to match the alternating voltage received direcly from the oscillator 3650 via the coupling transformers 3150a and 3601a with the alternating voltage received at the coupling transformer 3602a over the S lead associated with the line switch individual to the calling subscriber substation due to the switching operation of the various B relays in the associated group. Hence, it will be understood that when the appropriate B relay in the detector 2900 operates to connect the S lead associated with the line switch, individual to the calling subscriber line, to the tenth amplifier 0AMP, which S lead has impressed thereon the 5,000 cycle voltage, via the secondary winding 3154a of the coupling transformer 3150a, the tenth amplifier 0AMP operates immediately, as described above. However, in the event a stray alternating voltage, which differs even slightly in frequency from 5,000 cycles per second, is impressed upon the associated S lead, the tenth amplifier 0AMP will not operate in the manner described above, due to the fact that the stray alternating voltage impressed upon the connected S lead will fail to match the 5,000 cycle voltage connected to the tenth amplifier 0AMP via the coupling transformers 3150a and 3601a from the oscillator 3650. In fact, the tenth amplifier 0AMP may be rendered frequency selective within + or − a few cycles of the frequency of the alternating voltage established by the oscillator 3650, by utilizing the arrangement disclosed wherein the resistors R1 and R2 have a resistance of approximately 300,000 ohms and the condensers C1 and C2 have a capacity of approximately 0.1 mf.

This selectivity of the tenth amplifier 0AMP to the frequency of the alternating voltage produced by the oscillator 3650 will be understood when it is considered that any stray surge voltage appearing upon the connected S lead will be of an extremely short time duration. When the voltage impressed between the plate 3622a and the cathode 3624a is thus increased with respect to the voltage impressed between the plate 3621a and the cathode 3623a of the rectifier tube 3620a of the time duration mentioned, a greater current flows via the current path including the resistor R1 then via the current path including the resistor R2. However, the increased current traversing the resistor R1 with respect to the current traversing the resistor R2 persists only for the short time interval mentioned; and, in view of the relatively large capacitance of the condenser C1, the charge accumulated thereon will not increase the voltage thereacross appreciably during this short time interval. Hence, the bias on the control grid 3632a with respect to the cathode 3631a of the amplifier tube 3630a will not be sufficiently affected to render the amplifier tube 3630a conductive. Moreover, even though the amplifier tube 3630a were rendered conductive for an extremely short interval of time, the winding of the tenth test stop relay 0R would not be sufficiently saturated to cause the latter relay to operate. Furthermore, in order positively to prevent false operation of the tenth amplifier 0AMP, the transformation ratio between the primary and secondary windings of the coupling transformer 3601a is selected with reference to the transformation ratio between the primary and secondary windings of the coupling transformer 3603a and the amplifying factor of the driver tube 3663a with respect to possible external voltage surges impressed upon the primary winding 3602b of the coupling transformer 3602a, such that the reference voltage impressed between the plate 3622a and the cathode 3624a of the rectifier tube 3620a by the secondary winding 3601c of the coupling transformer 3601a is relatively high with respect to any possible amplified signal voltage which may be induced in the secondary winding 3667b of the coupling transformer 3603a.

On the other hand, in the event the S lead connected to the tenth amplifier 0AMP had a sustained alternating voltage thereon of a frequency reasonably different from the 5,000 cycle alternating voltage generated by the oscillator 3650, the amplified signal current traversing the primary winding 3667a of the coupling transformer 3603a would be of a periodicity considerably different from the alternating voltage applied to the secondary winding 3667b of the coupling transformer 3603a via the coupling transformer 3601a in the associated bridge circuit, whereby the periodicities of the two voltages would beat at a relatively high beat frequency.

In this case, when the amplified signal current induced in the secondary winding 3667b beat substantially in phase with the 5,000 cycle reference current traversing this secondary winding of the coupling transformer 3603a, the current traversing the path including the resistor R1 would be increased in order to cause the condenser C1 gradually to accumulate a charge greater than that accumulated by the condenser C2. However, before the voltage appearing across the condenser C1 predominates over the voltage appearing across the condenser C2 sufficiently to alter the bias applied to the control grid 3632a with respect to the cathode 3631a of the amplifier tube 3630a, in order to render the amplifier tube 3630a appreciably more conductive, the amplified periodic signal voltage and the 5,000 cycle reference voltage will not be beating substantially in phase. Hence, at this time the current traversing the current path including the resistor R1 is again decreased to that of the current traversing the current path including the resistor R2, whereby the voltage impressed across the condenser C1 is lowered toward that impressed across the condenser C2 in order again to maintain the negative bias of the control grid 3632a with respect to the cathode 3631a of the amplifier tube 3630a in order to render the amplifier tube 3630a less conductive before the tenth test stop relay 0R has operated.

Also, in this case when the amplified signal current induced in the secondary winding 3667b beats substantially entirely out of phase with the 5,000 cycle reference current traversing the secondary winding of the coupling transformer 3603a, the current traversing the path including the resistor R1 would be decreased in order to cause the condenser C1 gradually to accumulate a charge less than that accumulated by the condenser C2. Accordingly, the voltage impressed across the condenser C2 predominates over the voltage impressed across the condenser C1, whereby the control grid 3632a is rendered more negative with respect to the cathode 3631a in order to render the amplifier tube 3630a even less conductive.

In view of the above explanation of the mode of operation of the tenth amplifier 0AMP, it will be readily appreciated that it is extremely selective to frequency and phase variations in matching the detected signal voltage with the reference voltage received directly from the oscillator 3650. However, it is noted that the frequency of the alternating current produced by the oscillator 3650 may vary throughout a wide range without affecting the selectivity of the tenth amplifier 0AMP in view of the fact that whatever alternating voltage is generated by the oscillator 3650 is applied as a reference voltage directly to the tenth amplifier 9AMP as a standard of comparison which is match against the detected signal voltage; which detected signal voltage will closely match the reference voltage applied directly to the amplifier 0AMP when the detector 2900 has operated to detect the S lead extending to the line switch individually associated with the calling subscriber line, which S lead has impressed thereon the signal voltage from the oscillator 3650 at this time.

*Testing the amplifiers and the oscillator*

In order to test the output of the various vacuum tubes utilized in the ten amplifiers 0AMP to 9AMP, inclusive, and the oscillator 3650, a single milliammeter 3190a has been provided together with a plurality of manually controllable switching keys, whereby the output electrodes of the various tubes may be selectively connected to the milliammeter in order to measure the output of the selected vacuum tubes. Since the oscillator 3650 is common to all of the amplifiers 0AMP to 9AMP, inclusive, a single non-locking key K3175a has been provided in order to test the combined output of the tube 3651a and the multiply connected auxiliary tube 3653a, and a single non-locking key K3180a has been provided in order to test the combined output of the tube 3652a and the multiply connected auxiliary tube 3654a. Also, a single key K3140a has been provided which has a locking position and a non-locking position. When the latter key is actuated to its locking position the circuits controlled through the contacts thereof are so arranged that the milliammeter 3180a is transferred from the circuit, including the oscillator test keys K3175a and K3180a, to a circuit which is multiply connected to ten pairs of keys respectively associated with the ten amplifiers 0AMP to 9AMP, inclusive. The pair of keys K3110a and K3120a individual to the tenth amplifier 0AMP has been illustrated, but it should be understood that each of the remaining nine amplifiers 1AMP to 9AMP, inclusive, is connected to its respective pair of keys in the same manner. The key K3110a is provided so that when the common key K3140a has been actuated to its locking position a test may be made of the output of the diode 1, i. e., the right-hand electrodes 3622a and 3624a of the rectifier tube 3620a. On the other hand, the key K3120a is provided so that a test may be made of the diode 2, i. e., the left-hand electrodes 3621a and 3623a of the rectifier tube 3620a. The actuation of the key K3140a to its non-locking position transfers the circuit connections through the contacts thereof so that the milliammeter 3190a may be associated with any one of the ten keys, such as the key K3130a, individually associated with each of the ten amplifiers 0AMP to 9AMP. The key K3130a, which is individual to the amplifier tube 3630a of the tenth amplifier 0AMP, has been illustrated, but it should be understood that each of the remaining nine amplifiers 1AMP to 9AMP, inclusive, is connected to an individually associated key corresponding to the key K3130a, in the same manner. The key K3130a is provided so that it may be actuated at a time when the key K3140a is actuated to its non-locking position in order that a test may be made of the output of the amplifier tube 3630a of the tenth amplifier 0AMP.

Finally, each of the ten amplifiers 0AMP to 9AMP, inclusive, is provided with an individually associated key, such as the key K3170a, which is multiply connected to the milliammeter 3190a. These keys are provided in order to test the output of the driver tube, such as the driver tube 3663a, individually associated with the corresponding amplifiers. For example, the key K3170a is associated with the driver tube 3663a of the tenth amplifier 0AMP, and may be actuated in order to determine the output of the latter tube.

It will now be assumed that the attendant in the telephone exchange desires to test the output of the rectifier tube 3620a of the tenth amplifier 0AMP included in the detector 2900. In order to prepare the circuits to make this test, and to ascertain whether or not the associated detector 2900 is busy, the attendant actuates the key K3140a to its locking position whereupon a circuit is completed, at its contacts 1, in the event the associated detector 2900 is busy, from ground potential applied to the start conductor C3202 by way of the contacts 3638a, the contacts 1 of the key K3140a, and the busy lamp L3145a, to battery. The illumination of the lamp L3145a indicates to the attendant that the detector 2900 is being utilized to identify the numerical designation of a calling subscriber directory number and that the test should be postponed until the detector 2900 is idle. In the event the lamp L3145 is not illuminated, the attendant leaves the key K3140a in its actuated locking position and momentarily actuates the non-locking key K3110a in order to test the diode 1 of the rectifier tube 3620a individual to the tenth amplifier 0AMP. With the key K3110a held in its actuated position, and the key K3140a operated to its locking position, the milliammeter 3190a is connected in series with the output circuit of the right-hand electrodes 3622a and 3624a of the rectifier tube 3620a, over a circuit which may be traced from the upper or negative terminal of the milliammeter 3190a, the contacts 2 of the key K3140a, the contacts 2 of the key K3110a, the space current path including the cathode 3624a and the plate 3622a of the rectifier tube 3620a, the secondary winding 3667b of the coupling transformer 3603a, the secondary winding 3601c of the coupling transformer 3601a, the resistor R1, the contacts 3 of the key K3110a, and the contacts 5 of the key K3140a, to the lower or positive terminal of the milliammeter 3190a. Since the rectifier tube 3620a and the driver tube 3663a are normally conductive and are, therefore, responsive to the alternating voltage generated by the oscillator 3650 in the manner previously explained, the milliammeter 3190a will indicate the output characteristics of the right-hand electrodes of the rectifier tube 3620a and thus enable the attendant to determine whether or not the tube is properly functioning. When this test has been completed the attendant releases the key K3110a, which automatically restores to the position illustrated in the drawings, due to its non-locking characteristics, and then restores the key K3140a to its normal or neutral position.

If the attendant desires to test the diode 2, i. e., the left-hand electrodes of the rectifier tube 3620a, he again actuates the key K3140a to its locking position thereby to determine whether or not the detector 2900 is idle or busy, and, if idle, actuates the non-locking key K3120a. A circuit is now completed for connecting the milliammeter 3190a in the output circuit of the left-hand electrodes 3621a and 3623a of the rectifier tube 3620a, which may be traced from battery by way of the space current path including the cathode 3623a and the plate 3621a of the rectifier tube 3620a, the secondary winding 3601c of the coupling transformer 3601a, the resistor R2, the contacts 2 of the key K3120a, the contacts 2 of the key K3140a, the milliammeter 3190a, the contacts 5 of the key K3140a, the contacts 3 of the key K3120a, and negative battery potential. When the above-traced circuit is completed, the milliammeter 3190a will indicate the output characteristics of the left-hand electrodes of the rectifier tube 3620a and thus enable the attendant to determine whether or not the tube is properly functioning. When this test has been completed, the attendant releases the key K3120a which automatically restores to its normal position illustrated in the drawings, due to its non-locking characteristics, and then restores the key K3140a to its normal or neutral position.

In the event the attendant desires to test the output of the amplifier tube 3630a of the tenth amplifier 0AMP, the key K3140a is actuated to its non-locking position, whereupon a circuit is completed, at its contacts 13, to determine whether or not the associated detector 2900 is busy or idle. If the detector 2900 is idle the lamp L3145a will not be illuminated and the attendant thereafter actuates the non-locking tenth amplifier test key K3130a in order to associate the milliammeter 3190a with the output circuit of the amplifier tube 3630a. It will be recalled that the amplifier tube 3630a is normally rendered non-conductive by the negative potential applied to the control grid thereof by way of the resistors 3634a, the resistors R1 and R2 in series, and this negative potential was not altered until a signal current transmitted by the oscillator and received by the driver tube 3663a had altered the negative potential applied to the control grid 3632a of the amplifier tube 3630a to render it conductive. When the above-described test is being made of the amplifier tube 3630a, the tone signal is not received by the driver tube 3663a inasmuch as the detector 2900 is idle at the time the test is made by the attendant. Accordingly, it is necessary to alter the negative potential applied to the control grid 3632a of the amplifier tube 3630a when the test is made. Consequently, when the key K3140a is actuated to its non-locking position, a circuit is completed, at the contacts 12, which may be traced from ground by way of the contacts 3213 of the deenergized start relay R3210, the contacts 12 of the actuated key K3140a, and the winding of the relay R3635a to battery. The relay R3635a operates over this circuit and, at its contacts 3638a, disconnects the start conductor C3202 from the winding of the start relay R3210, in order positively to prevent the detector 2900 from being seized at the present time. Also, the relay R3635a, at its contacts 3639a, completes an energizing circuit for the winding of the relay R3640a. The relay R3640a now operates and, at its contacts 3641a, completes a circuit from negative battery potential by way of the resistor 3637a, the contacts 3641a, the multiply connected contacts 1 and 4 of the diode 1 key K3110a, and the resistor 3634a to the control grid 3632a of the amplifier tube 3630a. When this circuit is completed, the negative potential applied to the control grid 3632a of the amplifier tube 3630a is altered to render the amplifier tube conductive and, in effect, is substantially the same as if the negative potential applied to the control grid 3632a had been altered as the result of the detection of a signal received at the driver tube 3663a during the operation described hereinbefore of the detector 2999. Accordingly, when the tenth amplifier key K3130a is actuated, a circuit is completed whereby the milliammeter 3190a is included in the output circuit of the amplifier tube 3630a. This circuit may be traced from ground potential by way of the contacts 3 of the key K3130a, the contacts 11 of the key K3140a, the milliammeter 3190a, the contacts 8 of the key K3140a, the contacts 2 of the key K3130a, the winding of the test stop relay OR, the space current path including the plate 3635a and the cathode 3631a of the amplifier tube 3630a, and the resistor 3637a to battery potential. It is noted that an appropriate shunt resistance 3101a is placed across the terminals of the milliammeter 3190a when the contacts 8 and 11 of the key K3140a are closed. This shunt circuit is necessary in order to reduce the current flow through the milliammeter 3190a so that a proper reading may be made, since the output current of the amplifier tube 3630a is greater than that of the diodes of the rectifier tube 3620a. Consequently, when the milliammeter 3190a is included in the output circuit of the amplifier tube 3630a, it will indicate the output of the electrodes of the amplifier tube 3630a and thus enable the attendant to determine whether or not the tube is properly functioning, and also to determine whether or not the output current of the tube is sufficient to actuate the test stop relay OR. When the above-described test is completed, the attendant releases the keys K3130a and K3140a, which automatically restore to their neutral position, shown in the drawings, due to their nonlocking characteristics.

In the event the attendant desires to test the output characteristics of the driver tube 3663a, the attendant merely actuates the key K3170a in order to associate the milliammeter 3190a with the output circuit of the driver tube 3663a. When the key K3170a is actuated, a circuit is completed from ground potential by way of the contacts 2 of the key K3170a, the contacts 6 of the key K3175a, the contacts 2 of the key K3180a, the contacts 4 and 10 of the key K3140a, the milliammeter 3190a, the contacts 9 and 3 of the key K3140a, the contacts 3 of the key K3180a, the contacts 7 of the key K3175a, the contacts 3 of the key K3170a, the primary winding 3667a of the coupling transformer 3663a, the space current path including the plate electrode 3666a and the cathode electrode 3661a of the driver tube 3663a, the resistor 3662a, and negative potential. In this circuit it should also be noted that an appropriate shunt resistance 3102a is placed across the terminals of the milliammeter 3190a so that a proper indication will be given by the meter 3190a when the output of the driver tube 3663a is included in circuit therewith. When the milliammeter 3190a is included in the output circuit of the driver tube 3662a, the meter will now indicate the output characteristics of the electrodes of the driver tube 3663a and thus enable the attendant to determine whether or not the tube is properly functioning.

In the event the attendant desires to test the combined output characteristics of the oscillator 1 tube 3651a and the auxiliary oscillator tube 3653a, the nonlocking key K3175a is actuated to associate the milliammeter 3190a with the output circuit of the above-mentioned tubes. When the key K3175a is actuated, a circuit is completed from ground potential by way of the left-hand primary winding 3152a of the coupling transformer 3150a, the contacts 5 of the key K3175a, the contacts 2 of the key K3180a, the contacts 4 and 10 of the key K3140a, the milliammeter 3190a, the contacts 9 and 3 of the key K3140a, the contacts 3 of the key K3180a, the contacts 8 of the key K3175a, and the multiply connected space current paths including the plate and cathode of the tubes 3651a and 3653a, to battery potential. It should be noted that an appropriate shunt resistance 3103a is placed across the terminals of the milliammeter 3190a when the contacts 5 and 8 of the key K3175a are closed, whereby the milliammeter 3190a will give a proper indication of the combined output characteristics of the oscillator tubes 3651a and 3653a. Accordingly, when the milliammeter 3190a is included in the above-traced combined output circuit of the oscillator tubes 3651a and 3653a, it will indicate the combined output characteristics of the electrodes of the multiply connected oscillator tubes 3651a and 3653a and thus enable the attendant to determine whether or not these tubes are properly functioning. When the above-described test has been completed the attendant releases the key K3175a, whereupon the contacts thereof are automatically restored to the position illustrated, due to the nonlocking characteristics of the key K3175a.

In the event the attendant desires to make a corresponding test of the combined output characteristics of the oscillator 2 tube 3652a and the auxiliary oscillator tube 3654a, the key K3180a is actuated in order to associate the milliammeter 3190a with the combined output circuit of the above-mentioned tubes. When the key K3180a is actuated, a circuit is completed from ground potential by way of the primary winding 3151a of the coupling transformer 3150a, the contacts 1 of the key K3180a, the contacts 4 and 10 of the key K3140a, the milliammeter 3190a, the contacts 9 and 3 of the key K3140a, the contacts 4 of the key K3180a, and the space current paths including the plate and cathode of the multiply connected oscillator tubes 3652a and 3654a, to battery potential. It should also be noted that an appropriate resistance 3104a is placed across the terminals of the milliammeter 3190a when the contacts 1 and 4 are closed by the actuation of the key K3180a, whereby a proper indication will be given by the milliammeter 3190a of the combined output characteristics of the oscillator tubes 3652a and 3654a. When the milliammeter 3190a is included in the output circuit of the oscillator tubes 3652a and 3654a, it will indicate the combined output characteristics of the electrodes of these oscillator tubes, and thus enable the attendant to determine whether or not these tubes are properly functioning. When the above test has been completed by the attendant, the key K3180a is released and, due to its non-locking characteristics, the contacts thereof are restored to their neutral positions illustrated in the drawings.

*Conclusions*

In view of the foregoing, it is apparent that a telephone system is provided which comprises a detector operative to detect the directory number of a terminal individual to a calling subscriber substation; which detector incorporates a number of amplifiers and detector units which are operative to perform the detection mentioned and wherein new and novel arrangements are provided for testing the operating conditions and characteristics of various components of the detector.

While one embodiment of the invention has been disclosed, it will be understood that various modifications may be made therein which are within the true spirit and scope of the invention.

I claim:

1. In a telephone system, including a plurality of terminals; a detector comprising an oscillator for generating a voltage, a matching device, a detector tube, an amplifier tube, means for impressing said voltage as a reference voltage upon said matching device, means for selectively connecting said voltage as a signal voltage to any one of said terminals, progressively operated testing means for selectively connecting different ones of said terminals to said detector tube when any one terminal is impressed with said signal voltage, whereby said signal voltage is impressed upon said detector tube only when said one terminal is connected thereto, means including said matching device controlled by said detector tube when a signal voltage bears a fixed relation to said reference voltage impressed upon said matching device for controlling said amplifier tube, means controlled responsive to said control of said amplifier tube for identifying said one terminal, an indicator, and selectively operable keys including contacts for selectively connecting said indicator to said detector tube or to said matching device or to said oscillator or to said amplifier tube, whereby a test may be selectively made to determine the operating characteristics of said detector tube or said matching device or said oscillator or said amplifier tube.

2. In a telephone system including a plurality of terminals; a detector comprising an oscillator for generating a voltage, a matching device, a detector tube having an output circuit, an amplifier tube, means for impressing said voltage as a reference voltage upon said matching device, means for selectively connecting said voltage as a signal voltage to any one of said terminals, progressively operated testing means for selectively connecting different ones of said terminals to said detector tube when any one terminal is impressed with said signal voltage, whereby said signal voltage is impressed upon said detector tube only when said one terminal is connected thereto, means including said matching device controlled by said detector tube over its output circuit when said signal voltage impressed upon said detector tube bears a fixed relation to said reference voltage impressed upon said matching device for controlling said amplifier tube, means controlled by said amplifier tube for identifying said one terminal, an indicator, a manual key having a normal position and an operated position, contacts controllable by said key in said normal position included in said detector tube output circuit, and contacts controlled by said key in response to actuation thereof from said normal position to said operated position for including said indicator in said detector tube output circuit in order to determine the magnitude of the voltage traversing said output circuit when said signal voltage is impressed upon said detector tube.

3. In a telephone system including a plurality of terminals; a detector comprising an oscillator for generating a voltage, a matching device, a detector tube, an amplifier tube having an output circuit, means for impressing said voltage as a reference voltage upon said matching device, means for selectively connecting said voltage as a signal voltage to any one of said terminals, progressively operated testing means for selectively connecting different ones of said terminals to said detector tube when any one terminal is impressed with said signal voltage, whereby said signal voltage is impressed upon said detector tube only when said one terminal is connected thereto, means including said matching device controlled by said detector tube when a signal voltage bears a fixed relation to said reference voltage impressed upon said matching device for controlling said amplifier tube, means controlled by said amplifier tube over its output circuit for identifying said one terminal, an indicator, a manual key having contacts for selectively connecting said amplifier tube output circuit to said indicator in order to determine the output voltage of said amplifier tube, and additional contacts on said key for preventing operation of said progressively operated testing means at the time said key selectively connects said amplifier tube output circuit to said indicator.

4. In a telephone system including a plurality of lines, a common oscillator and a transformer network for impressing a signal voltage upon any one of said lines having a predetermined condition thereon, a plurality of devices corresponding to different ones of said lines, means including said oscillator and said transformer network normally impressing a reference voltage upon each of said devices, means for progressively connecting different ones of said lines to different ones of said devices to test for and find said one line impressed with said signal voltage, whereby said signal voltage is impressed upon one of said devices when said one line is connected thereto, means controlled by said one device when said signal voltage impressed thereupon matches said reference voltage impressed thereupon for detecting the identity of said one line having said signal voltage impressed thereon, an indicator common to said plurality of devices, a manually operable key individual to each of said devices, contacts governed in response to the operation of any one of said keys for selectively connecting the corresponding device to said indicator, and means included in said selected device for impressing said reference voltage upon said indicator over a circuit including said contacts of said operated key to determine the value of the said reference voltage impressed on said selected device.

5. In a telephone system including a plurality of lines, a common oscillator and a transformer network for generating a signal voltage and for impressing said signal voltage upon any one of said lines having a predetermined condition thereon, a plurality of devices corresponding to different ones of said lines, means including said oscillator and said transformer network for impressing a reference voltage upon each of said devices, means for progressively connecting different ones of said lines to different ones of said devices to test for and find said one line impressed with said signal voltage, whereby said signal voltage is impressed upon a particular one of said devices when said one line is connected thereto, means controlled by said one device when said signal voltage impressed thereupon matches said reference voltage impressed thereupon for detecting the identity of said one line having said signal voltage impressed thereon, an indicator common to said plurality of devices, an individual manually operable key for each of said devices, contacts individual to each of said keys and individually controlled responsive to the operation of the associated one of said keys for selectively connecting the reference voltage impressed upon the corresponding one of said devices to said indicator in order to selectively control said indicator to determine the value of the reference voltage impressed upon any selected one of said devices, a manually operable key common to all of said devices, and contacts controlled responsive to the operation of said common key for selectively connecting said oscillator to said indicator in order to selectively control said indicator to determine the value of said signal voltage generated by said oscillator.

6. In a telephone system including a plurality of lines, a detector comprising an oscillator for generating a voltage and a transformer network, a plurality of devices corresponding respectively to different ones of said lines, each of said devices including an amplifier tube and a rectifier tube, means including said oscillator and said transformer network normally impressing said voltage as a reference voltage upon said rectifier tube in each of said devices, means including said oscillator and said transformer network controlled responsive to a call on one of said lines for selectively connecting said voltage as a signal voltage to said one calling line, progressively operated testing means for selectively connecting different ones of said lines to different ones of said rectifier tubes when said signal voltage is connected to said one calling line, whereby said signal voltage is impressed upon the one of said rectifier tubes in the one device corresponding to said calling line only when said calling line is connected thereto, means including said one rectifier tube controlled responsive to the simultaneous impression of said signal voltage and said reference voltage upon said one rectifier tube for controlling said amplifier tube, means controlled by said amplifier tube included in said one device for identifying said one calling line, an indicator common to said devices, a manually operable key common to said devices, a manually operable key individual to each of said amplifier tubes, contacts controlled in response to the selective operation of said common key for preventing said connecting means from connecting said signal voltage to any of said lines and for selectively controlling each of said amplifier tubes, and contacts controlled responsive to the selective operation of one of said individual keys for connecting the corresponding amplifier tube to said identifying means and to said indicator, whereby said corresponding amplifier tube controls said identifying means and said indicator.

7. In a telephone system including a plurality of lines, a detector comprising an oscillator for generating a voltage, a transformer network, a normally non-conductive amplifier tube, a rectifier tube, means including said oscillator and said transformer network normally impressing said voltage as a reference voltage upon said rectifier tube, means including said oscillator and said transformer network controlled responsive to a call on one of said lines for selectively connecting said voltage as a signal voltage to said one calling line, progressively operating testing means for selectively connecting different ones of said lines to said rectifier tube when any one line has said signal voltage connected thereto, whereby said signal voltage is impressed upon said rectifier tube only when said calling line is connected thereto, means including said rectifier tube controlled responsive to the simultaneous impression of said signal voltage and said reference voltage upon said rectifier tube for controlling said amplifier tube to render the same conductive, means controlled responsive to the conductivity of said amplifier tube for identifying said one calling line, an indicator, a first manually operable key common to said oscillator, contacts controlled in response to the selective operation of said first key for preventing said connecting means from connecting said signal voltage to any of said lines and for selectively controlling said amplifier tube to render the same conductive, a second manually operable key individual to said amplifier tube, and contacts controlled thereafter in response to the selective operation of said second key for connecting said identifying means to said indicator, whereby said conductive amplifier tube controls said identifying means and said indicator.

8. In a telephone system including a plurality of lines, a detector comprising an oscillator for generating a voltage, a transformer network, a normally non-conductive amplifier tube, a rectifier tube, means including said oscillator and said transformer network normally impressing said voltage as a reference voltage upon said rectifier tube, means including said oscillator and said transformer network operated responsive to a call on one of said lines for selectively connecting said voltage as a signal voltage to said one calling line, progressively operating testing means for selectively connecting different ones of said lines to said rectifier tube when any one line has said signal voltage connected thereto, whereby said signal voltage is impressed upon said rectifier tube only when said calling line is connected thereto, means including said rectifier tube controlled responsive to the simultaneous impression of said signal voltage and said reference voltage upon said rectifier tube for controlling said amplifier tube to render the same conductive, means controlled responsive to the conductivity of said amplifier tube for identifying said one calling line, an indicator common to said oscillator, a first manually operable key common to said oscillator, means controlled in response to the selective operation of said first key for determining whether or not said signal voltage connecting means is operated and for preventing operation of said signal voltage connecting means in the event it is not operated and for selectively controlling said amplifier tube to render the same conductive, a second manually operable key individual to said amplifier tube, and means controlled in response to the selective operation of said second key for connecting said amplifier tube to said indicator, whereby said conductive amplifier tube controls said indicator.

9. In a telephone system including a plurality of lines, a detector comprising an oscillator for generating an alternating current, an electron discharging device including two space current paths, two impedance elements, two circuits respectively including said space current paths and said two impedance elements, means including a transformer network for connecting said alternating current as a reference current to said two circuits, whereby substantially balanced currents traverse said two circuits, means including said transformer network controlled in response to a call on one of said lines for selectively connecting said alternating current, as a signal current to said one calling line, progressively operated testing means for selectively connecting different ones of said lines to one of said circuits, whereby the relative magnitude of the currents traversing said two circuits are unbalanced when said one calling line is connected thereto, an amplifier tube controlled responsive to an unbalance of said currents traversing said two circuits, means operated in response to said control of said amplifier tube for identifying said one calling line, an indicator common to said oscillator, a first manually operable key common to said oscillator, a second manually operable key individual to said amplifier tube, a relay directly controlled in response to the selective operation of said first key for preventing said connecting means from connecting said signal current to any one of said lines and for preventing operation of said testing means, contacts controlled in response to the selective operation of said first key for selectively unbalancing the currents traversing said two circuits, and contacts controlled thereafter in response to the selective operation of said second key for connecting said identifying means to said indicator, whereby said amplifier tube controls said identifying means and said indicator in response to said unbalancing of said currents traversing said two circuits by said selective operation of said first key.

10. In a telephone system including a plurality of lines, a detector comprising an oscillator for generating an alternating current, an electron discharging device including two space current paths, two impedance elements, two circuits respectively including said space current paths and said two impedance elements, means including a transformer network for connecting said alternating current as a reference current to said two circuits, whereby substantially balanced currents traverse said two circuits, means including said transformer network controlled in response to a call on one of said lines for selectively connecting said alternating current as a signal current to said one calling line, progressively operated testing means for selectively connecting different ones of said lines to one of said circuits, whereby the relative magnitude of the currents traversing said two circuits are unbalanced when said one calling line is connected thereto, an amplifier tube controlled responsive to an unbalance of said currents traversing said two circuits, means operated in response to said control of said amplifier tube for identifying said one calling line, an indicator common to said oscillator, a first manually operable key common to said oscillator, a manually operable key individual to each of said two circuits and common to said first key, contacts controlled in response to the selective operation of said first key for connecting said indicator to each of said individual keys, and contacts controlled thereafter in response to the selective operation of either of said individual keys for selectively connecting said indicator to the corresponding one of said two circuits in order to determine the magnitude of the current traversing the selected one of said two circuits.

11. In a telephone system including a plurality of lines, a common push-pull oscillator comprising a pair of tubes having individual output circuits and adapted to transmit a voltage thereover, a transformer network coupled to said output circuits impressing said voltage as a signal voltage upon any calling one of said lines, a plurality of devices corresponding respectively to different ones of said lines, said transformer network normally impressing said voltage as a reference voltage upon each of said devices, means progressively operated for connecting different ones of said lines to different ones of said devices to test for and find said one calling line impressed with said original voltage, whereby said signal voltage is impressed upon the one of said devices corresponding to said one line when said one line is connected thereto, means controlled by said one device when said signal voltage impressed thereupon matches said reference voltage impressed thereupon for detecting the identity of said one line having said signal voltage impressed thereon, an indicator, a pair of manually operable keys corresponding respectively to said output circuits, and contacts individual to each of said keys and controlled in response to the operation of the associated one of said keys for selectively connecting the corresponding output circuit to said indicator in order to determine the value of the voltage transmitted thereover.

JOHN E. OSTLINE.

REFERENCES CITED

The following references are of record in the file of this patent:

UNITED STATES PATENTS

| Number | Name | Date |
|---|---|---|
| 1,569,676 | Powell | Jan. 12, 1926 |
| 1,672,336 | Ostline | June 5, 1928 |
| 2,077,537 | Taylor | Apr. 20, 1937 |
| 2,387,897 | Grandstaff | Oct. 30, 1945 |
| 2,440,277 | Kruithof | Apr. 27, 1948 |